United States Patent
Jeon

(10) Patent No.: US 9,856,126 B2
(45) Date of Patent: Jan. 2, 2018

(54) WATER DISPENSER

(71) Applicant: LG ELECTRONICS INC., Seoul (KR)

(72) Inventor: Jewook Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/483,568

(22) Filed: Apr. 10, 2017

(65) Prior Publication Data

US 2017/0291807 A1  Oct. 12, 2017

(30) Foreign Application Priority Data

Apr. 11, 2016  (KR) .................. 10-2016-0044248

(51) Int. Cl.
| | |
|---|---|
| *B67D 1/08* | (2006.01) |
| *B67D 1/00* | (2006.01) |
| *C02F 1/00* | (2006.01) |
| *C02F 1/28* | (2006.01) |
| *C02F 1/44* | (2006.01) |

(52) U.S. Cl.
CPC ......... *B67D 1/0859* (2013.01); *B67D 1/0014* (2013.01); *B67D 1/0855* (2013.01); *B67D 1/0895* (2013.01); *C02F 1/003* (2013.01); *C02F 1/283* (2013.01); *C02F 1/444* (2013.01); *C02F 2307/10* (2013.01)

(58) Field of Classification Search
CPC ... B67D 1/0859; B67D 1/0855; F25D 31/002; F25D 31/003
See application file for complete search history.

(56) References Cited

U.S. PATENT DOCUMENTS

2008/0229845 A1\* 9/2008 Minard ................ B67D 1/0855
  73/861.08

FOREIGN PATENT DOCUMENTS

| EP | 1514836 | \* | 3/2005 | ........... B67D 1/0057 |
|---|---|---|---|---|
| KR | 20-0157412 Y1 | | 9/1999 | |
| KR | 10-2009-0094558 A | | 9/2009 | |
| KR | 10-2011-0001353 A | | 1/2011 | |
| KR | 10-2015-0104378 A | | 9/2015 | |

\* cited by examiner

*Primary Examiner* — Cassey D Bauer
(74) *Attorney, Agent, or Firm* — Dentons US LLP

(57) ABSTRACT

A water dispenser includes a filter unit filtering raw water supplied from a raw water supply unit to produce purified water, a cold water tank assembly cooling purified water to produce cold water, a refrigerating cycle device maintaining cooling water filled in a cooling water accommodation unit at a low temperature, a cooling water flow channel supplying water to the cooling water accommodation unit, a flow rate sensor measuring a flow rate of water supplied to the cooling water accommodation unit, a stirrer to stir the cooling water filled in the cooling water accommodation unit, and a controller determining whether cooling water has been filled up to a reference water level on the basis of a rotation speed of the stirrer per unit time.

12 Claims, 11 Drawing Sheets

WATER DISPENSER

CROSS-REFERENCE TO RELATED APPLICATION

Pursuant to 35 U.S.C. §119(a), this application claims the benefit of earlier filing date and right of priority to Korean Application No. 10-2016-0044248, filed on Apr. 11, 2016, the contents of which is incorporated by reference herein in its entirety.

BACKGROUND

1. Field

The present disclosure relates to a cooling water supply structure of a water dispenser generating cold water using a coolant (or cooling water) and a normal water supply checking structure.

2. Background

In general, a water dispenser (or a water purifier) is a device for filtering out various harmful components included in raw water such as tap water, underground water, and the like, through several stages of a filter installed in a main body thereof to change such water into stable and hygienic drinking water.

To this end, in order to supply purified water which has passed through the filter to a water ejection unit according to a user selection, the water dispenser includes a cold water flow channel, a hot water flow channel, a purified water flow channel, and the like, and controls a flow of water by a mechanical or electronic valve.

Water dispensers may be classified into a water tank type water dispenser and a direct water type water dispenser. The water tank type water dispenser is configured to keep purified water in a water tank and provide water kept in the water tank when a user operates a water ejection unit. In contrast, the direct water type water dispenser is configured to filter raw water immediately when a user operates a water ejection unit to provide purified water to the user, without a water tank. Compared with the water tank type water dispenser, the direct water type water dispenser is hygienic and water-saving, and thus, user preference regarding the direct type water dispenser has recently increased.

A water dispenser provides hot water and cold water in addition to room temperature water. The water dispenser providing hot water and cold water has a heating device and a cooling device, separately, therein. The heating device is configured to heat purified water to generate hot water and the cooling device is configured to cool purified water to generate cold water.

The cooling device may generate cold water through various methods. One of the methods is to use a cooling water having a temperature lower than that of purified water. When cooling water having a temperature lower than that of purified water receives heat from purified water, the purified water is cooled to become cold water. When purified water is cooled using cooling water, cold water may be rapidly generated, and thus, a cooling scheme using cooling water may be adopted in the zo direct water type water dispenser.

In order to generate cold water, a cooling water tank, or the like, should be always filled with cooling water. However, since cooling water is stagnant, rather than flowing, cooling water is required to be replaced periodically for sanitary purposes. Also, when cooling water is insufficient, cooling water should be added to the cooling water tank. When cooling water is replaced or added, water should be supplied up to a reference water level in the cooling water tank, or the like.

In some water dispensers, an operator or a user directly opens a cover of the cooling water tank of the water dispenser, or the like, to supply water, and determine whether water has been supplied up to a reference water level using a water level sensor.

The scheme in which a special service personnel or a user opens the cover of the cooling water tank, or the like, to supply water is inconvenient in that the cover of the cooling water tank should be opened each time. Also, with this scheme, water may not be normally supplied according to a person who performs operations. Unlike the special service personnel, a general user may incompletely complete an operation.

The scheme of determining whether water has been supplied to a reference water level using a water level sensor may inevitably require a water level sensor and an additional component related to the water level sensor. Also, the water level sensor may be broken down.

Thus, a new water supply scheme capable of solving the problems such as inconvenience of opening the cover, or the like, a possibility of an incomplete operation, malfunction of a water dispenser due to a fault of a component such as a water level sensor, or the like, may be considered.

SUMMARY

Therefore, a first objective of the detailed description is to provide a water dispenser capable of supplying cooling water to a reference water level for a normal operation of the water dispenser to a cooling water tank, or the like, through an improved scheme solving the problem of the background art, and measuring an amount of the supplied cooling water in an improved manner.

A second objective of the present disclosure is to provide a water dispenser capable of supplying cooling water to a space to be filled with cooling water, without having to open a cover of a cooling water tank, or the like.

A third objective of the present disclosure is to provide a water dispenser capable of determining whether water has been supplied up to a reference water level for a normal operation of the water dispenser using only components basically provided in the wafer purifier without a water level sensor.

A fourth objective of the present disclosure is to provide a water dispenser capable of solving a problem that an operation is incompletely completed according to an operator.

To achieve these objectives and other advantages and in accordance with the purpose of this specification, as embodied and broadly described herein, a water dispenser includes: a filter unit filtering raw water supplied from a raw water supply unit to produce purified water; a cold water tank assembly having a cooling water accommodation unit configured to accommodate cooling water, having a cold water generating flow channel immersed in the cooling water, and cooling the purified water passing through the cold water generating flow channel by the cooling water filled in the cooling water accommodation unit to produce cold water; a refrigerating cycle device having a compressor, a condenser, an expansion device, and an evaporator installed on an inner side of the cold water tank assembly to maintain the cooling water filled in the cooling water accommodation unit at a low temperature; a cooling water flow channel connected to the cold water tank assembly and supplying the water to the cooling water accommodation unit; a flow rate sensor installed in the cooling water flow channel to measure a flow rate of water supplied to the cooling water accommodation unit through the cooling water flow channel; a stirrer protruding from an inner upper wall of the cold water tank assembly and configured to be rotatable to stir cooling water filled in the cooling water accommodation unit; and a controller to stop the supply of water to the cooling water accommodation unit on the basis of a water supply amount measured by the flow rate sensor, and to determine whether the cooling water has been filled up to a reference water level on the basis of a rotation speed of the stirrer per unit time. The water being either raw water or purified water.

According to an example related to the present disclosure, the water dispenser may further include: a drain valve installed in the cold water tank assembly to form an entry/exit flow channel of the cooling water held in the cooling water accommodation unit and exposed to the outside of a main body of the water dispenser; and a dispensing unit exposed to the outside of the main body of the water dispenser to discharge purified water or cold water supplied from the cold water tank assembly, wherein at least a portion of the cooling water flow channel may be formed by a hose exposed to the outside of the main body of the water dispenser, and one end the hose may be connected to the dispensing unit and the other end thereof may be connected to the drain valve to supply purified water dispensed through the dispensing unit to the cooling water accommodation unit.

According to another example related to the present disclosure, the hose may be detachably coupled to the dispensing unit and the drain valve.

According to another example related to the present disclosure, the water dispenser may further include: an input unit for receiving a user's control command, wherein when a control command is applied through the input unit after the hose is coupled to the dispensing unit and the drain valve, supply of purified water to the cooling water accommodation unit through the dispensing unit and the hose may start.

According to another example related to the present disclosure, the drain valve may be opened and closed by a pressing force applied from the outside of the water dispenser.

According to another example related to the present disclosure, the drain valve may include: a housing having a hollow part and having a first arrest protrusion formed in the hollow part and a second arrest protrusion formed on an upstream side of the first arrest protrusion; a press operating part disposed in the hollow part of the housing and having a first part caught by the first arrest protrusion and a second part exposed to the outside and receiving a pressing force for opening and closing the drain valve; and an elastic member installed in a position supported by the second arrest protrusion and providing elastic force to allow the first part of the press operating part to be tightly attached to the first arrest protrusion.

According to another example related to the present disclosure, the hose may include: a pressing part formed in the hollow part of the hose and pressing the press operating part when the hose is coupled to the drain valve; and connection parts radially disposed around the pressing part to connect the pressing part to an inner circumferential surface of the hose.

According to another example related to the present disclosure, at least a portion of the cooling water flow channel may be formed by a pipe installed within the water dispenser, and one end of the pipe may be connected to the raw water supply unit or the filter unit and the other end thereof may be connected to the cold water tank assembly to supply raw water supplied from the raw water supply unit or purified water produced by the filter unit to the cooling water accommodation unit.

According to another example related to the present disclosure, the water dispenser may start to supply water to the cooling water accommodation unit on the basis of a replacement period of cooling water, a contamination degree of cooling water filled in the cooling water accommodation unit, or a rotation speed of the stirrer per unit time.

According to another example related to the present disclosure, the water dispenser may further include: an output unit displaying state information of the water dispenser, wherein the output unit may indicate that water should start to be supplied to the cooling water accommodation unit on the basis of a rotation speed of the stirrer per unit time.

According to the present disclosure having the configuration described above, cooling water may be filled in the cooling water accommodation unit through the drain valve basically provided in the direct type water dispenser. Thus, according to the present disclosure, the problem in which the cold water tank cover should be opened each time to replace cooling water may be solved.

Also, according to the present disclosure, it may be determined whether cooling water has been supplied up to the reference water level through the stirrer basically provided in the direct type water dispenser. Thus, whether cooling water has been supplied up to the reference water level for a normal operation of the water dispenser may be determined even without a water level sensor of the cold water tank assembly. Thus, the water dispenser may not include a water level sensor, and the present disclosure may basically solve a problem of malfunction of the water dispenser due to a breakdown of the water level sensor.

Also, according to the present disclosure, the same result may be obtained no matter who performs supplying of cooling water, and thus, a problem in which an operation is uncompleted according to operators may be solved.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION

Hereinafter, water dispenser will be described in detail with reference to the accompanying drawings, in which like numbers refer to like elements throughout although the embodiments are different. As used herein, the singular forms "a", "an", and "the" are intended to include the plural forms as well, unless the context clearly indicates otherwise. In the following description, usage of suffixes such as 'module', 'part', or 'unit' used for referring to elements is given merely to facilitate explanation of embodiments of the present invention, without having any significant meaning by itself.

To facilitate descriptions of the disclosure, the present disclosure will be divided into embodiment 1 and embodiment 2 according to configurations to supply cooling water to a cooling water accommodation unit so as to be described. Embodiment 1 has a configuration in which a hose is manually connected to an outer side of a main body of a water dispenser to supply cooling water. Embodiment 2 has a configuration in which cooling water is automatically supplied using a pipe installed within the main body of the water dispenser. Also, embodiment 1 is classified into embodiment 1-1 and embodiment 1-2 according to configurations of a drain valve and a hose. Embodiment 2 is classified into embodiment 2-1 and embodiment 2-2 according to whether cooling water is formed by purified water or raw water.

Figure 1:
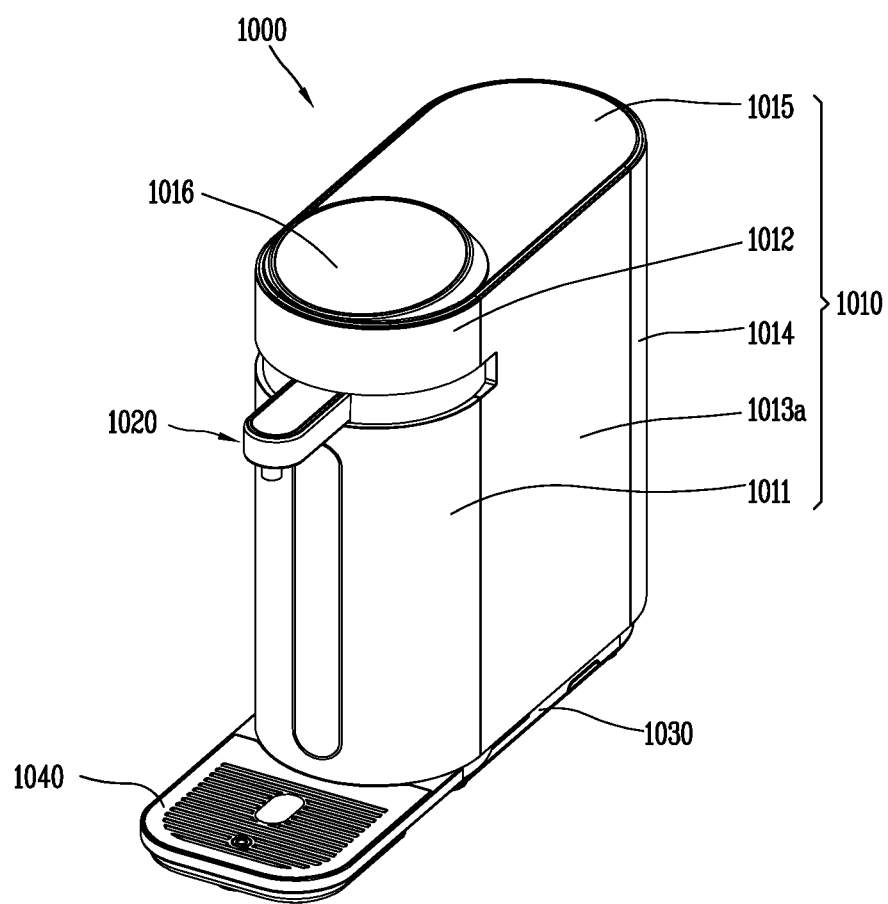
FIG. 1 is a perspective view of a water dispenser according to the present disclosure.

FIG. 1 is a perspective view of a water dispenser 1000 of the present disclosure.

Water dispenser 1000 includes a cover 1010, a dispensing unit (or a water ejection unit) 1020, a base 1030, and a tray 1040.

Cover 1010 forms an appearance of the water dispenser 1000. The appearance formed by cover 1010 may be termed a main body of the water dispenser 1000. Components for filtering raw water are typically installed within cover 1010. Cover 1010 covers the components to protect the components. Cover 1010 may also be referred to as a case or a housing. Whatever it is called, any component may correspond to the cover 1010 described in the present disclosure as long as it forms an appearance of the water dispenser 1000 and is configured to cover the components filtering raw water.

Cover 1010 may be formed as a single component or may be formed by combining several components. For example, as illustrated in FIG. 1, cover 1010 may include a front cover 1011, a rear cover 1014, a side panel 1013a, an upper cover 1012, and a top cover 1015.

Front cover 1011 is disposed on a front side of the water dispenser 1000. Rear cover 1014 is disposed on a rear side of the water dispenser 1000. Here, the front side and the rear side of the water dispenser 1000 are set in relation to a direction in which a user views the dispensing unit 1020 straight ahead. However, the concept of the front side and the rear side of the water dispenser 1000 are not absolute and may vary depending on how the water dispenser 1000 is described.

Side panel 1013a is disposed on the left and right of the water dispenser 1000. Side panel 1013a is disposed between the front cover 1011 and the rear cover 1014. Side panel 1013a may be coupled to the front cover 1011 and the rear cover 1014. Side panel 1013a substantially forms a side surface of the water dispenser 1000.

Upper cover 1012 is disposed on the front side of the water dispenser 1000. Upper cover 1012 is installed in a position higher than the front cover 1011. Dispensing unit 1020 is exposed to a space between the upper cover 1012 and the front cover 1011. Upper cover 1012 forms an appearance of the front side of the water dispenser 1000 together with the front cover 1011.

Top cover 1015 forms an upper surface of the water dispenser 1000. An input/output unit 1016 may be formed on a front side of the top cover 1015. The input unit of 1016 is configured to receive a user's control command. The way in which the input unit receives a user's control command may include both a touch input or a physical pressurization, and the like, or selectively include any one thereof. The output unit of 1016 may be configured to visually/audibly provide state information of the water dispenser 1000 to a user.

Dispensing unit (or a cock assembly) 1020 serves to provide purified water to the user according to a user's control command. At least a portion of the dispensing unit 1020 is exposed to outside of the main body of the water dispenser 1000 in order to supply water. In particular, water dispenser 1000 is configured to provide purified water having room temperature, cold water having a temperature lower than room temperature, and hot water having a temperature higher than room temperature, and at least one of purified water having room temperature, cold water, and hot water may be dispensed to the user through the dispensing unit 1020 according to a control command input by the user.

Dispensing unit 1020 may be configured to rotate according to user operation. Front cover 1011 and upper cover 1012 form a rotation region of the dispensing unit 1020 therebetween, and the dispensing unit 1020 may rotate horizontally in the rotation region. Dispensing unit 1020 may be rotated by a force physically applied to the dispensing unit 1020 by the user. Also, dispensing unit 102 may be rotated on the basis of a control command entered by the user to the input/output unit 1016. A component implementing rotation of the dispensing unit 1020 may be installed within the water dispenser 1000, and specifically, it may be installed in a region covered by the upper cover 1020. The input/output unit 1016 may be implemented to be rotated together with the dispensing unit 1020 when the dispensing unit 1020 rotates.

Base 1030 forms a bottom of the water dispenser 1000. Internal components of the water dispenser 1000 are supported by the base 1030. When the water dispenser 1000 is placed on the floor, a shelf, or the like, the base 1030 faces the floor, the shelf, or the like. Thus, when the water dispenser 1000 is placed on the floor, the shelf, or the like, a structure of the base 1030 is not exposed outwardly.

Tray 1040 is disposed to face the dispensing unit 1020. When the water dispenser 1000 is installed as illustrated in FIG. 1, tray 1040 faces the dispensing unit 1020 in a vertical direction. Tray 1040 is configured to support a container for receiving purified water, or the like, dispensed through the dispensing unit 1020. Also, the tray 1040 is formed to accommodate residual water dropped from the dispensing unit 1020. When the tray 1040 receives and accommodates residual water dropped from the dispensing unit 1020, contamination around the water dispenser 1000 due to residual water may be prevented.

Since the tray 1040 is required to receive residual water dropped from the dispensing unit 1020, the tray 1040 may also be implemented to rotate together with the dispensing unit 1020. Preferably, the input/output unit 1016 and the tray 1040 are implemented to rotate together with the dispensing unit 1020 in the same direction.

Figure 2:
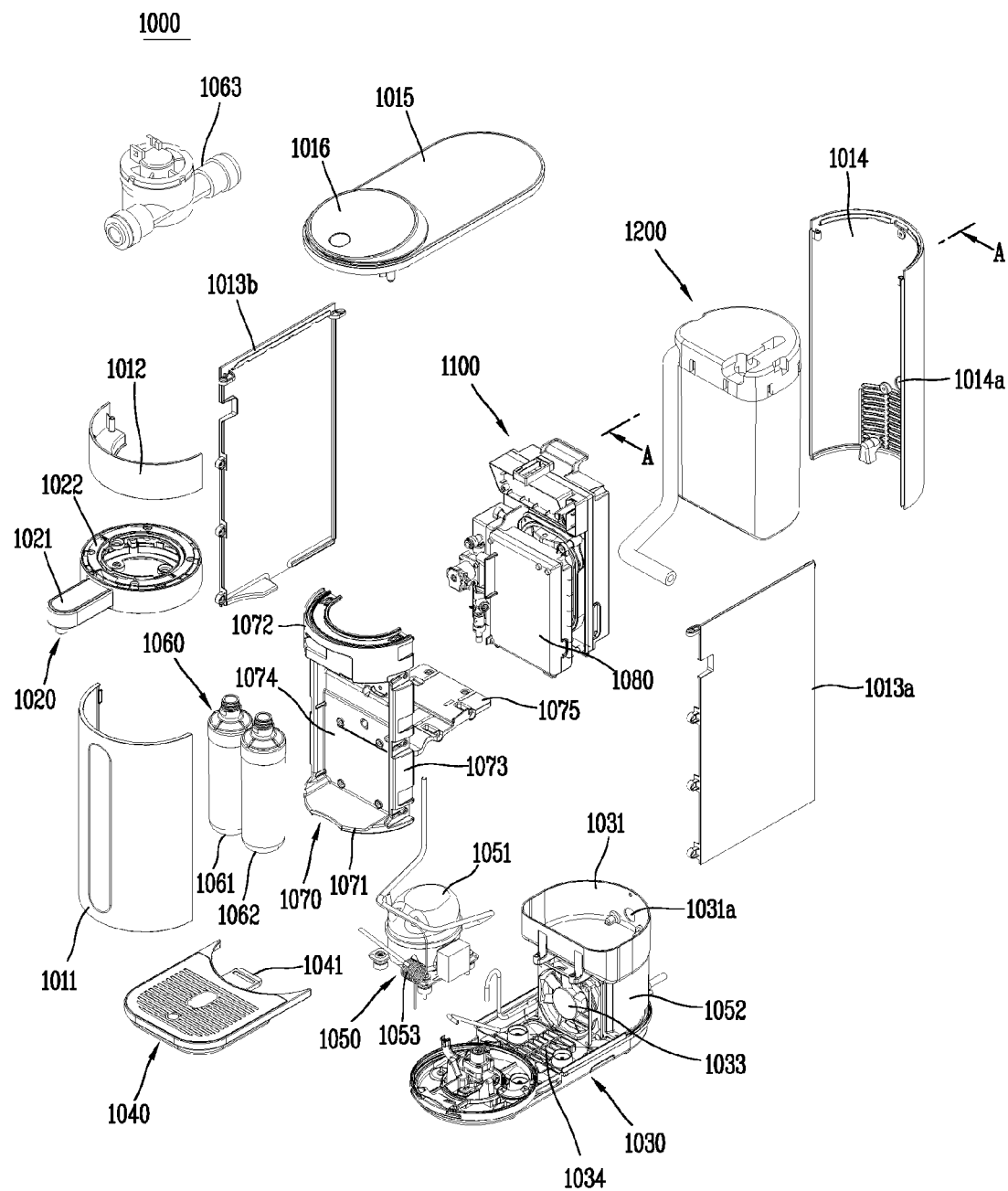
FIG. 2 is an exploded perspective view illustrating an internal configuration of the water dispenser of FIG. 1.

FIG. 2 is an exploded perspective view illustrating an internal configuration of the water dispenser 1000 of FIG. 1.

A filter unit 1060 is installed on an inner side of the front cover 1011. Filter unit 1060 is configured to filter raw water supplied from a raw water supply unit to produce purified water. It may be difficult to produce purified water appropriate for the user using a single filter, and thus, the filter unit 1060 may include a plurality of unit filters 1061 and 1062. The unit filters 1061 and 1062 include, for example, a pre-filter such as a carbon block or an adsorption filter and a highly efficient filter such as a HEPA (high efficiency particulate air) filter or a UF (ultra filtration) filter. In FIG. 2, two unit filters 1061 and 1062 are installed, but the number of the unit filters 1061 and 1062 may be increased or decreased as necessary.

The plurality of unit filters 1061 and 1062 may be connected according to a preset order. The preset order refers to order appropriate for the filter unit 1060 to filter raw water. Raw water may include various foreign materials. Particles such as hair, dust, and the like, may degrade filtering performance of the highly efficient filters such as the HEPA filter or the UF filter, and thus, the highly efficient filters should be protected from the large particles such as hair or dust. Thus, in order to protect the highly efficient filters, the pre-filter is required to be installed on an upstream side of the highly efficient filters.

The pre-filter is configured to remove large particles from water. When the pre-filter is disposed on an upstream side of the highly efficient filters, it can remove large particles included in raw water. Then the raw water not including large particles may be supplied to the highly efficient filters, and thus, the highly efficient filters may be protected. Raw water which has passed through the pre-filter may subsequently be filtered by the HEPA filter or the UF filter.

Purified water generated by the filter unit 1060 may be directly provided to the user through the dispending unit 1020. In this case, a temperature of the purified water provided to the user is equal to room temperature. Alternatively, purified water produced by the filter unit 1060 may be heated by a heating device 1100 or may be cooled by a cold water tank assembly 1200.

A flow rate sensor 1063 is configured to measure a flow rate of raw water or purified water according to an installation position. When a sensor measuring a flow rate of raw water is a first flow rate sensor, the first flow rate sensor is installed on a downstream side of the raw water supply unit and on an upstream side of the filter unit 1060. When a sensor measuring a flow rate of purified water is a second flow rate sensor, the second flow rate sensor is installed on flow rate sensor is installed on a down stream side of the filter unit 1060. The water dispenser 1000 may include both the first flow rate sensor and the second flow rate sensor or may include only one of them.

Flow rate sensor 1063 may be configured to measure a flow rate of cooling water filling the inside of the cold water tank assembly 1200. In the present disclosure, cooling water is formed of raw water or purified water, and thus, a flow rate of raw water or purified water measured by the flow rate sensor 1063 is equivalent to a flow rate of cooling water. Water dispenser 1000 of the present disclosure is configured such that a preset flow rate of cooling water is provided to the inside of the cold water tank assembly 1200 using the flow rate sensor 1063. Details thereof will be described hereinafter.

A filter bracket assembly 1070 is a structure fixing the unit filters 1061 and 1062 of the filter unit 1060 and fixing a water ejection flow channel of purified water or cold water, a valve, a sensor, and the like.

A lower portion 1071 of the filter bracket assembly 1070 is coupled to the tray 1040. The lower portion 1071 of the filter bracket assembly 1070 is formed to accommodate a protrusion coupling portion 1041 of the tray 1040. As the protrusion coupling portion 1041 of the tray 1040 is inserted into the lower portion 1071 of the filter bracket assembly 1070, the filter bracket assembly 1070 and the tray 1040 are coupled.

The lower portion 1071 of the filter bracket assembly 1070 and the tray 1040 have curved surfaces corresponding to each other. The lower portion 1071 of the filter bracket assembly 1070 may rotate independently with respect to the other remaining portions of the filter bracket assembly 1070.

An upper portion 1072 of the filter bracket assembly 1070 is configured to support the dispensing unit 1020. The upper portion 1072 of the filter bracket assembly 1070 forms a rotation path of the dispensing unit 1020. The dispensing unit 1020 may be divided into a first part 1021 outwardly protruding from the water dispenser 1000 and a second part 1022 disposed within the water dispenser 1000. The second part 1022 may have a circular shape as illustrated in FIG. 2 for the purpose of rotation. The second part 1022 is mounted on the upper portion 1072 of the filter bracket assembly 1070. The upper portion 1072 of the filter bracket assembly 1070 may rotate independently with respect to the other remaining portions of the filter bracket assembly 1070.

The lower portion 1071 and the upper portion 1072 of the filter bracket assembly 1070 may be connected to each other by a vertical connection part 1073. The lower portion 1071 and the upper portion 1072 of the filter bracket assembly 1070 connected to each other by the vertical connection part 1073 may rotate in the same direction. When the user rotates the dispensing unit 1020, the upper portion 1072, the vertical connection part 1073, and the lower portion 1071 of the filter bracket assembly 1070 connected to the dispensing unit 1020 and the tray 1040 may be rotated together.

A filter installation region 1074 configured to accommodate the unit filters 1061 and 1062 of the filter unit 1060 may be formed between the lower portion 1071 and the upper portion 1072 of the filter bracket assembly 1070. The filter installation region 1074 provides an installation space of the unit filters 1061 and 1062.

A support 1075 protruding toward a rear side of the water dispenser 1000 is formed on the opposite side of the filter installation region 1074. The support 1075 is configured to support a controller 1080 and the heating device 1100. The controller 1080 and the heating device 1100 are mounted on the support 1075. Support 1075 is disposed between the heating device 1100 and a compressor 1051 to cut off transmission of heat formed by the heating device 1100 to the compressor 1051, or the like.

Controller 1080 is configured to generally control the water dispenser 1000. Various printed circuit boards (PCBs) controlling operations of the water dispenser 1000 may be installed in the controller 1080.

Heating device 1100 is configured to heat purified water generated by the filter unit 1060 to produce hot water. Heating device 1100 has components configured to heat purified water, such as an induction heating module, and the like. Heating device 1100 may receive purified water from the filter unit 1060 and hot water generated by the heating device 1100 is dispensed through the dispensing unit 1020.

A refrigerating cycle device is configured to generate cold water. The refrigerating cycle device refers to an aggregation of devices continuously performing compression, condensation, expansion, and evaporation of a refrigerant. In order to produce cold water in the cold water tank assembly 1200, first, the refrigerating cycle device should operate to make cooling water, filling the inside of the cold water tank assembly 1200, have a low temperature.

The refrigerating cycle device includes a compressor 1051, a condenser 1052, an expansion device 1053, an evaporator 1054 (please refer to FIG. 3), and a refrigerant flow channel connecting these elements. The refrigerant flow channel may be formed by a pipe, or the like, and connect the compressor 1051, the condenser 1052, the expansion device 1053, and the evaporator 1054 to form a circulation flow channel of a refrigerant.

Compressor 1051 is configured to compressor a refrigerant. Compressor 1051 is connected to the condenser 1052 by the refrigerant flow channel, and a refrigerant compressed by the compressor 1051 flows to the condenser 1052 through the refrigerant flow channel. Compressor 1051 is disposed below the support 1075 and installed to be supported by the base 1030.

Condenser 1052 is configured to condense a refrigerant. The refrigerant compressed by the compressor 1051 flows to the condenser 1052 through the refrigerant flow channel and is condensed by the condenser 1052. The refrigerant condensed by the condenser 1052 flows to the expansion device 1053 through the refrigerant flow channel.

The refrigerant is expanded by the expansion device 1053. The expansion device 1053 is configured to expand a refrigerant and, a capillary, a throttle valve, or the like, may form the expansion valve 1053. The capillary may be rolled in a coil form to secure a sufficient length in a narrow space.

Evaporator 1054 (please refer to FIG. 3) is configured to evaporate a refrigerant and is installed on an inner side of the cold water tank assembly 1200. The evaporator 1054 will be described hereinafter with reference to other drawings in which the evaporator is illustrated.

Base 1030 is configured to support front cover 1011, rear cover 1014, both side panels 1013*a* and 1013*b,* filter bracket assembly 1070, condenser 1052, fan 1033, and the like. Base 1030 preferably has high rigidity to support these elements.

Condenser 1052 and fan 1033 may be installed on a rear side of the water dispenser 1000, and in order to dissipate heat from the condenser 1052, air is required to be continuously circulated. For air circulation, an intake 1034 may be provided on a bottom of the base 1030. Air sucked through the intake 1034 is moved by the fan 1033. Moving toward the condenser 1052, air realizes air cooling type cooling. In order to increase heat dissipation efficiency of the condenser 1052, a duct structure covering the fan 1033 and the condenser 1052 may be fixed to the base 1030. A holder 1031 for supporting the cold water tank assembly 1200 may be installed on the condenser 1052.

Holder 1031 has a first hole 1031*a* on a rear side, and the rear cover 1014 has a second hole 1014*a*. First hole 1031*a* and second hole 1014*a* are formed in positions corresponding to each other. First hole 1031*a* and second hole 1014*a* allow a drain valve for draining cooling water filled in the cold water tank assembly 1200 to be disposed. The drain valve will be described hereinafter.

Cold water tank assembly 1200 may be formed to accommodate cooling water therein. Cold water tank assembly 1200 receives purified water generated in the filter unit 1060. In particular, in the case of the direct type water dispenser 1000 not having a separate water storage tank, the cold water tank assembly 1200 may directly receive purified water from the filter unit 1060.

A temperature of cooling water filling the cold water tank assembly 1200 may be lowered according to an operation of the refrigerating cycle device 1050. Cold water tank assembly 1200 is configured to cool purified water with cooling water to form cold water.

Cooling water is stored in the cold water tank assembly 1200 and does not circulate, and thus, contamination of cooling water may be increased over time. For sanitary reasons, cooling water stored in the cold water tank assembly 1200 should be periodically discharged outwardly and the cold water tank assembly 1200 is required to be filled with fresh cooling water.

Figure 3:
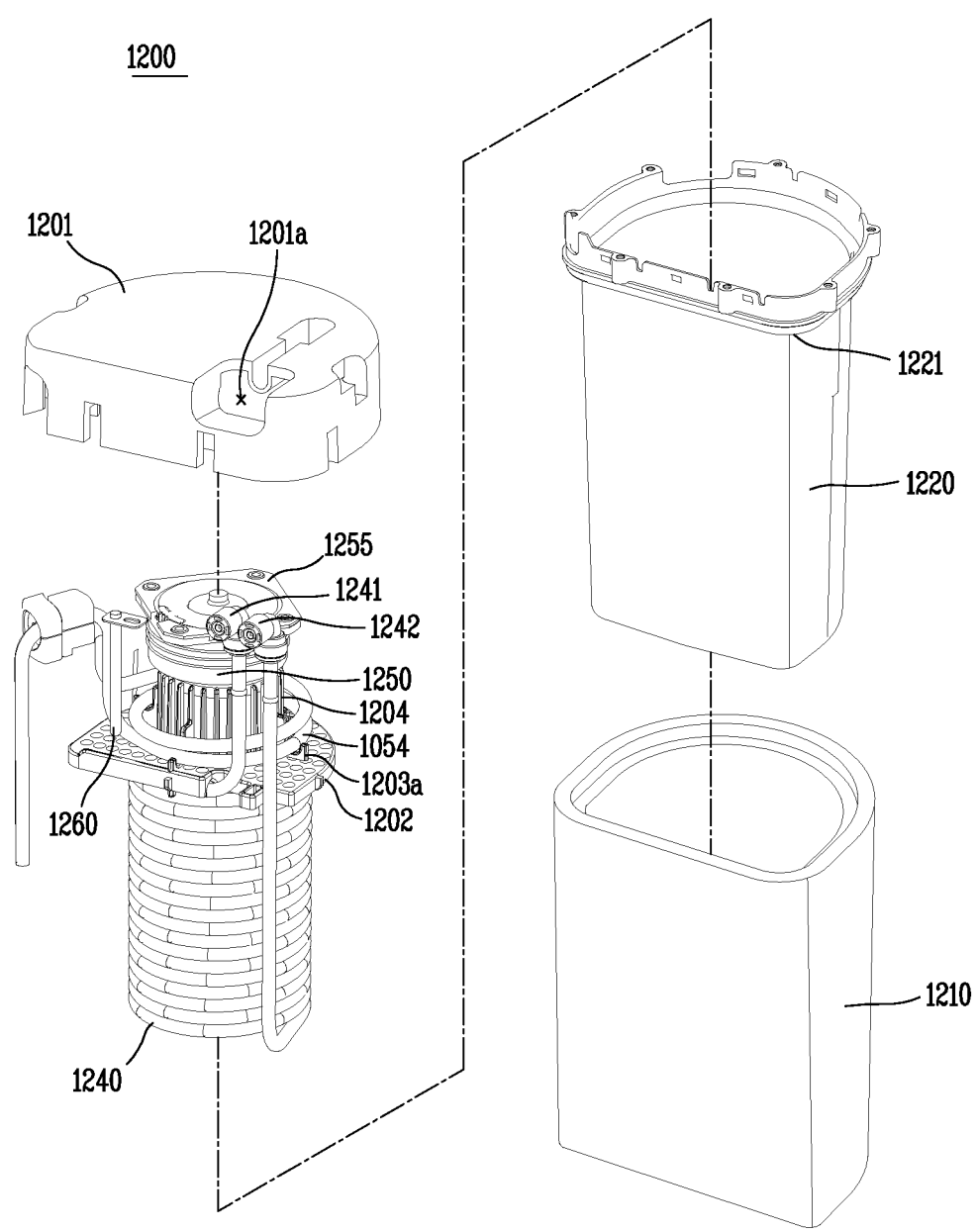
FIG. 3 is an exploded perspective view of a cold water tank assembly illustrated in FIG. 2.

FIG. 3 is an exploded perspective view of the cold water tank assembly 1200 of FIG. 2.

Cold water tank assembly 1200 has a cooling water accommodation unit 1220 formed to accommodate cooling water. The cooling water accommodation unit 1220 is provided in the form of a water storage tank and filled with cooling water. Although the cooling water accommodation unit 1220 is provided in the form of a water storage tank, the water dispenser is still classified as a direct water type water dispenser. This is because cooling water for producing cold water, rather than purified water to be provided to the user, is stored in the cooling water accommodation unit 1220.

An upper end of the cooling water accommodation unit 1220 is open, and edges of the upper end are formed to be coupled to the cold water tank cover 1201. As the cold water tank cover 1201 is coupled to the cooling water accommodation unit 1220, an internal space of the cooling water accommodation unit 1220 may be hermetically closed.

An insulator 1210 of the cold water tank assembly 1200 is formed through a foaming process performed by a foaming jig, and a barrier 1221 for preventing overflow of a bubble solution during the foaming process is formed in an upper portion of the cooling water accommodation unit 1220. Barrier 1221 protrudes along an outer circumferential surface of the upper portion of the cooling water accommodation unit 1220. Barrier 1221 is configured to be in contact with an inner circumferential surface of the foaming jig to prevent overflow of the bubble solution introduced to the foaming jig.

Insulator 1210 is configured to cover the cooling water accommodation unit 1220. In detail, insulator 1210 is formed to cover an outer circumferential surface and a bottom surface of the cooling water accommodation unit

1220. Insulator 1210 is formed by performing a foaming process in a state in which the cooling water accommodation unit 1220 and a bubble solution are introduced to a foaming jig. Thus, the cooling water accommodation unit 1220 has a structure of being inserted into the insulator 1210, and the insulator 1210 has a structure of accommodating the cooling water accommodation unit 1220.

The insulator 1210 is configured to suppress heat transmission between cooling water filled in the cooling water accommodation unit 1220 and ambient air. Suppression of heat transmission by the insulator 1210 between cooling water and ambient air reduces power consumption and prevents dew formation.

First, cooling water is required to be maintained at low temperatures to produce cold water, but when cooling water is continuously heat-exchanged with ambient air, a temperature of the cooling water may be gradually increased. When a temperature of the cooling water is increased, the refrigerating cycle device is required to additionally operate to maintain the cooling water at low temperatures, which consumes power. Thus, when the insulator 1210 has sufficient insulation performance, power consumed by the refrigerating cycle device may be saved.

Also, insulator 1210 prevents dew formation on an outer circumferential surface of the cooling water accommodation unit 1220. Dew is formed as steam in the air is condensed at a temperature lower than that of a dew point. Thus, in order to prevent dew formation, a temperature of ambient air should be prevented from being lowered than that of the dew point by cooling water. The insulator 1210 suppresses heat transmission between cooling water and ambient air to prevent dew formation on the cooling water accommodation unit 1220, the cold water tank assembly 1200, and the drain valve (to be described hereinafter).

The cold water tank cover 1201 is formed to cover the insulator 1210 and the cooling water accommodation unit 1220 inserted into the insulator 1210. The cold water tank cover 1201 is coupled to an upper end of the cold water tank assembly 1200. In the related art water dispenser, the cold water tank cover 1201 should be opened each time to fill a cold water tank, the cooling water accommodation unit 1220, and the like, with cooling water, causing inconvenience. In contrast, however, the water dispenser of the present disclosure is configured such that the cooling water accommodation unit 1220 is filled with cooling water without opening the cold water tank cover 1201 and whether cooling water has been up to a reference water level is checked.

A hole 1201*a* is formed in the cold water tank cover 1201 and configured to accommodate an inlet 1241 and an outlet 1242 of a cold water generating flow channel 1240. The inlet 1241 and the outlet 1242 of the cold water generating flow channel 1240 are disposed in the hole 1201*a*. The inlet 1241 is formed at one end of the cold water generating flow channel 1240 and connected to the filter unit 1060 (please refer to FIG. 2). The outlet 1242 is formed at the other end of the cold water generating flow channel 1240 and connected to the dispensing unit 1020 (please refer to FIG. 2).

The cold water generating flow channel 1240 is configured to allow purified water supplied from the filter unit to pass therethrough. The cold water generating flow channel 1240 extends from an entrance to form a coil. Here, the form of coil refers to a form in which the cold water generating flow channel 1240 is stacked, while drawing a concentric circle. The reason why the cold water generating flow channel 1240 is formed as a coil or a spring is to secure a sufficient heat exchange area.

The evaporator 1054 may partially have a form of a coil or a spring like the cold water generating flow channel 1240. The reason why the evaporator 1054 has a form of coil is to secure a sufficient heat exchange area like the cold water generating flow channel 1240.

The evaporator 1054 is configured to evaporate a refrigerant. The refrigerant is evaporated through heat exchange with cooling water. Heat is transmitted from cooling water to a refrigerant. The refrigerant receiving heat from the cooling water is evaporated, and cooling water which has transmitted its heat to the refrigerant may be maintained at low temperatures. The refrigerant evaporated through heat exchange with cooling water flows again to the compressor through the refrigerant flow channel and circulates in the refrigerating cycle device.

Since the cold water generating flow channel 1240 and the evaporator 1054 are formed in the same form of a coil, a hollow part is formed on an inner side thereof. A stirrer (to be described hereinafter) is installed in the hollow part. The stirrer is rotated by a motor. The cold water tank assembly 1200 includes a motor protecting unit 1250 formed to cover a circumference of the motor and a motor cover 1255 configured to cover the motor. The motor cover 1255 is coupled to an upper side of the motor protecting unit 1250.

A plate 1202 may be disposed between the cold water generating flow channel 1240 and the evaporator 1054. A plurality of support portions 1204 are installed between the plate 1202 and the motor protecting unit 1250. The plurality of support portions 1204 are configured to support the motor protecting unit 1250 and are supported by the plate 1202. The plurality of support portions 1204 are spaced apart from each other to allow a cooling water to pass therethrough. A position fixing portion 1203*a* configured to fix positions of the cold water generating flow channel 1240 and the evaporator 1054 may be formed on both sides of the plate 1202. The position fixing portion 1203*a* has a groove, and the cold water generating flow channel 1240 and the evaporator 1054 may be disposed in the groove of the position fixing portion 1203*a*. The position fixing portion 1203*a* also serves to support the motor protecting unit 1250.

A thermistor 1260 is installed on an inner side of the cold water tank assembly 1200. Thermistor 1260 is configured to measure a temperature of a measurement target using characteristics that a resistance value is changed according to temperature. Thermistor 1260 measures a temperature of cooling water and a temperature of cooling water measured by the thermistor 1260 is used as a basis for determining an operation of the refrigerating cycle device.

Cold water tank assembly 1200 cools purified water passing through the cold water generating flow channel 1240 with cooling water stored in the cooling water accommodation unit 1220. Purified water supplied from the filter unit is cooled, while passing through the cold water generating flow channel 1240. Since the cold water generating flow channel 1240 is immersed in cooling water stored in the cooling water accommodation unit 1220, purified water flowing in the cold water generating flow channel 1240 is continuously heat-exchanged with cooling water so as to become cold water.

Figure 4:
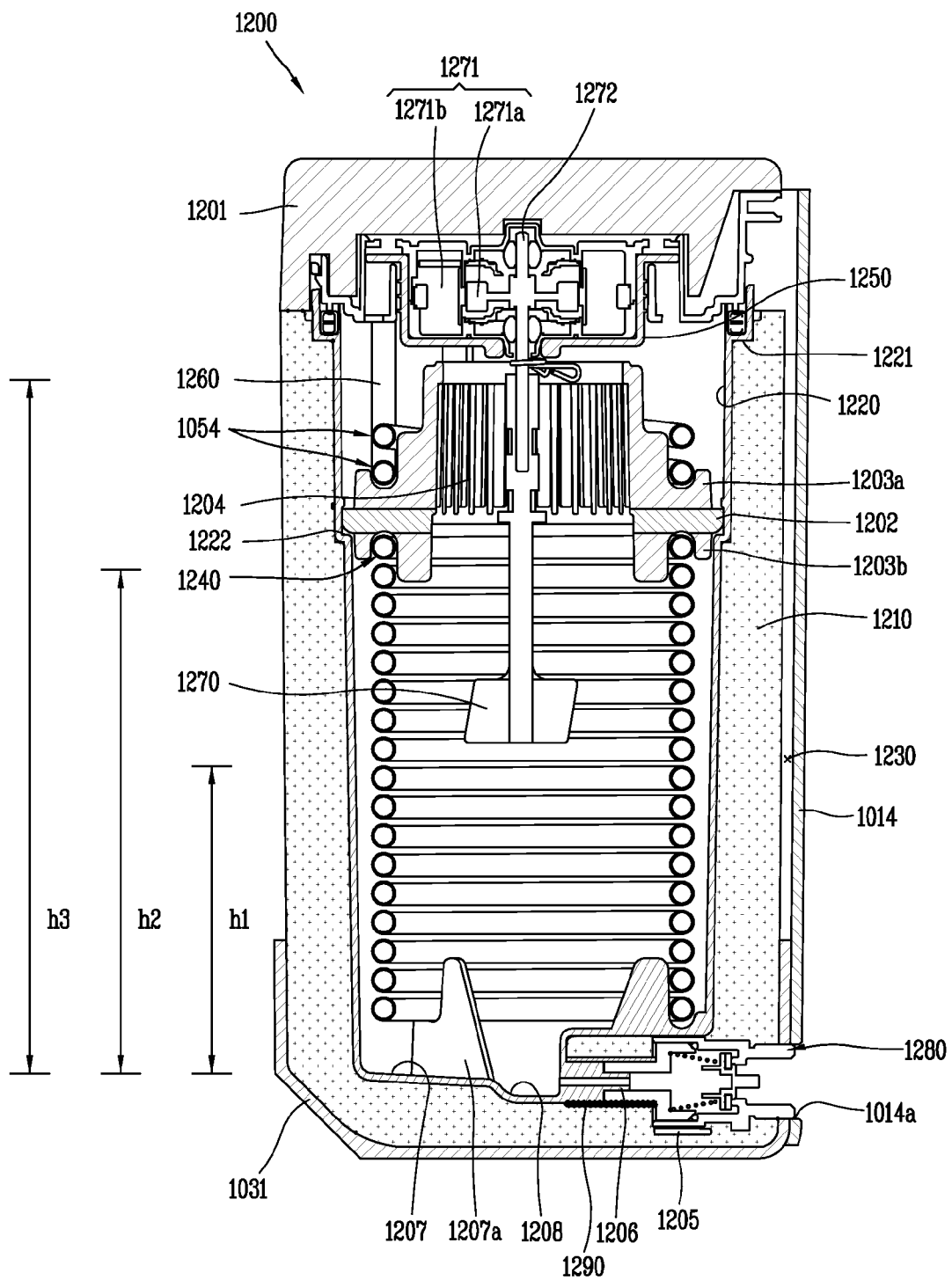
FIG. 4 is a cross-sectional view illustrating a cold water tank assembly and a rear cover of a water dispenser related to embodiment 1-1 of the present disclosure.

FIG. 4 is a cross-sectional view illustrating the cold water tank assembly 1200 and the rear cover 1014 of a water dispenser related to embodiment 1-1. FIG. 4 is a cross-sectional view of the cold water tank assembly 1200 and the rear cover 1014, taken along line A-A of FIG. 2.

In order to produce cold water, cooling water should be maintained at a low temperature, and here the low temperature may come between a first reference temperature and a second reference temperature.

When a temperature of cooling water is high, it is difficult to produce cold water, and thus, the refrigerating cycle device should operate to lower a temperature of cooling water to a temperature range in which cold water can be produced. Here, the temperature at which the refrigerating cycle device operates is set to the first reference temperature.

Conversely, a lower temperature of cooling water is more advantageous in producing cold water, but an excessive operation of the refrigerating cycle device wastes power consumed by the water dispenser. Thus, a temperature of the cooling water may be lowered to a temperature level at which cold water is sufficiently produced, and a temperature lower than the temperature level is not preferred from a vantage point of saving power. Here, the temperature level of cooling water sufficient for producing cold water is set to the second reference temperature.

When a temperature of cooling water measured by thermistor 1260 is equal to or higher than the first reference temperature, the refrigerating cycle device of the water dispenser 1000 operates to lower the temperature of cooling water. Compressor 1051 and condenser 1052 described above with reference to FIG. 2 operate to compress and condense a refrigerant, and the expansion device 1053 expands the refrigerant. The expanded refrigerant passes through evaporator 1054 installed within the cold water tank assembly 1200. Cooling water stored in the cooling water accommodation unit 1220 is heat-exchanged with the refrigerant passing through the evaporator 1054 so as to be cooled. Cooling water may be maintained at a low temperature according to mutual operation of the thermistor 1260 and the refrigerating cycle device.

The stirrer 1270 is installed to protrude from an upper wall of the inner side of the cold water tank assembly 1200. Stirrer 1270 is immersed in cooling water and is rotatable around an axis to stir cooling water stored in the cooling water accommodation unit 1220. Stirrer 1270 is a device for accelerating heat exchange between fluids within the cold water tank assembly 1200. A fluid within the cold water tank assembly 1200 is a refrigerant, cooling water, or purified water, and thus, the stirrer 1270 accelerates heat exchange between cooling water and a refrigerant and heat exchange between cooling water and purified water.

Motor 1271 is installed on the upper wall of an inner side of the cold water tank assembly 1200, and the cooling water tank cover 1201 covers the motor 1271. The motor 1271 includes a rotor 1271a and a stationary stator 1271b, and the rotor 1271a and the stator 1271b are accommodated in the motor protecting unit 1250. Stirrer 1270 is connected to the rotor 1271a by a shaft 1272, and when the rotor 1271 rotates, the stirrer 1270 also rotates.

Thermistor 1260 continuously measures a temperature of cooling water. When a temperature measured by the thermistor 1260 is lower than the second reference temperature, the refrigerating cycle device stops operation. The second reference temperature is lower than the first reference temperature. The first reference temperature and the second reference temperature are used as references for operating and stopping the refrigerating cycle device. A temperature of cooling water stored in the cold water tank assembly 1200 may be maintained between the first reference temperature and the second reference temperature according to temperature measurement by the thermistor 1260 and an operation of the refrigerating cycle device.

A rotation rate of stirrer 1270 per unit time is varied according to water levels of cooling water filled in the cooling water accommodation unit 1220. When a water level of cooling water corresponds to h1, the stirrer 1270 is not immersed in cooling water, and thus, rotation of the stirrer 1270 is not resisted. Thus, when a water level of cooling water corresponds to h1, the stirrer 1270 may rotate rapidly.

When a water level of cooling water corresponds to h2, stirrer 1270 may be immersed in cooling water and rotation of the stirrer 1270 may be resisted. In this case, a rotation rate of the stirrer 1270 per unit time is lowered, compared with the case in which a water level of cooling water is h1. However, since the water level of cooling water corresponding to h2 is a water level at which the evaporator 1054 is not immersed in cooling water, it is a water level insufficient for producing cold water.

When a water level of cooling water corresponds to h3, stirrer 1270 is immersed more than that of h2, and rotation of the stirrer 1270 may be highly resisted by cooling water, compared with h2. Thus, a rotation rate of the stirrer 1270 per unit time is slower than that of the case in which a water level of cooling water is h2. Also, since a water level of cooling water corresponding to h3 is a water level at which the evaporator 1054 is immersed in cooling water, it is sufficient for producing cold water.

In this manner, it may be determined whether cooling water has been filled up to the reference water level on the basis of a rotation rate of the stirrer 1270 per unit time. The reference water level refers to a water level sufficient for producing cold water. Also, the water level sufficient for producing cold water refers to a water level at which all the cold water generating flow channel 1240, the evaporator 1054, and the stirrer 1270 are immersed in cooling water. In FIG. 4, flow channels from a cross-section of a flow channel denoted by reference numeral 1240 to a bottom surface 1207 are all cold water generating flow channels 120. Purified water passing through the cold water generating flow channel 1240 is heat-exchanged with cooling water. Heat is transmitted from purified water to cooling water, and purified water becomes cold water within a short time through heat exchange with cooling water. Stirrer 1270 rotates on the basis of an axis to accelerate heat-exchange between purified water and cooling water.

Plate 1202 is positioned in a boundary of the evaporator 1054 and the cold water generating flow channel 1240. A step 1222 is formed along an edge on an inner surface of the cooling water accommodation unit 1220, and the plate 1202 is supported by the step 1222. The position fixing portions 1203a and 1203b are formed on upper and lower surfaces of the plate 1202, and the evaporator 1054 and the cold water generating flow channel 1240 are disposed in the groove of the position fixing portions as described above.

A cold water generating flow channel support portion 1207a is formed to support a lower portion of the cold water generating flow channel 1240. The cold water generating flow channel support portion 1207a protrudes from an inner bottom surface of the cold water tank assembly 1200 toward the cold water generating flow channel 1240. A groove having a size corresponding to an outer circumferential surface of the cold water generating flow channel 1240 is formed on the cold water generating flow channel support portion 1207a. The cold water generating flow channel 1240 is mounted in the groove of the cold water generating flow channel support portion 1207a and supported by the cold water generating flow channel support portion 1207a.

Cooling water stored in the cold water tank assembly 1200 is required to be periodically replaced for cleanliness. Cooling water is drained through a drain valve 1280 forming a drain flow channel.

Drain valve 1280 is connected to the cold water tank assembly 1200. Drain valve 1280 is installed in the cold water tank assembly 1200 to form a discharge flow channel of cooling water filled within the cold water tank assembly 1200. At least a portion of the drain valve 1280 is exposed to an outside of the main body of the water dispenser 1000.

Cold water tank assembly 1200 includes a protruding drain flow channel 1206. The protruding drain flow channel 1206 protrudes from the cooling water accommodation unit 1220 and is connected to the drain valve 1280. The protruding drain flow channel 1206 is inserted into the drain valve 1280. Since the drain valve 1280 is configured to discharge cooling water outwardly from the water dispenser 1000, when the protruding drain flow channel 1206 is inserted into the drain valve 1280, a flow channel for draining cooling water stored in the cold water tank assembly 1200 is formed.

Drain valve 1280 is fixed by a fixing part 1205. Details of the drain valve 1280 and the fixing part 1205 will be described hereinafter.

The inner bottom surface 1207 may be sloped to smoothly drain water. Since cooling water is drained by a natural force, if the inner bottom surface 1207 of the cold water tank assembly 1200 is flat, cooling water may be pooled in a partial region thereof. A phenomenon in which cooling water is pooled in a partial region of the inner bottom surface 1207 is not desirable in terms of sanitation. However, as illustrated in FIG. 4, when the inner bottom surface 1207 of the cold water tank assembly 1200 is sloped toward the drain flow channel, pooling of cooling water may be prevented.

Also, the cold water tank assembly 1200 may include an anti-pooling drain part 1208. The anti-pooling drain part 1208 forms a drain flow channel together with the drain valve 1280. The anti-pooling drain part 1208 is formed by depressing the inner bottom surface 1207 of the cold water tank assembly 1200. The anti-pooling drain part 1208 forms a bottom surface lower than the inner bottom surface 1207 of the cold water tank assembly 1200, and at least a portion thereof may be sloped.

The anti-pooling drain part 1208 is configured to collect cooling water filled in the cold water tank assembly 1200 and drain the same to the drain valve 1280. Since the anti-pooling drain part 1208 forms a bottom surface lower than the inner bottom surface 1207 and is sloped, cooling water is not pooled on the inner bottom surface 1207. Cooling water is collected in the anti-pooling drain part 1208 and discharged through the drain valve 1280.

The reason why the insulator 1210 covers the cooling water accommodation unit 1220 is to cold-insulate the cooling water accommodation unit 1220. Without the insulator 1210, a temperature of cooling water filled in the cooling water accommodation unit 1220 is gradually close to room temperature due to natural heat transmission. Insulator 1210 serves to suppress transmission of heat in the air from cooling water to lower a rate at which the temperature of cooling water becomes close to room temperature.

Insulator 1210 surrounds the drain valve 1280 to prevent formation of dew on the drain valve 1280. The reason why the insulator 1210 surrounds the drain valve 1280 is to prevent the drain valve 1280 from being in contact with air. Dew is formed as vapor in the air is condensed, and thus, when the drain valve 1280 is prevented from being in contact with air, formation of dew thereon may be prevented. Insulator 1210 prevents the drain valve 1280 from being in contact with air to prevent formation of dew on an outer circumferential surface of the drain valve 1280.

Insulator 1210 of the present disclosure surrounds even the drain valve 1280, as well as the cooling water accommodation unit 1220. Thus, the insulator 1210 cold-insulates the cooling water accommodation unit 1220 and prevents formation of dew on the drain valve 1280. Thus, the present disclosure may obtain the additional effect of preventing occurrence of a phenomenon in which dew is formed on the drain valve 1280 using the insulator 1210 for insulation of the cooling water accommodation unit 1220.

Insulator 1210 is formed of polyurethane (PU), and is formed through a foaming process. Thus, the insulator 1210 may be termed a PU foam. Conventionally, an insulator called expandable polystyrene (EPS) was used to cold-insulate water purifiers. However, gap(s) may form in the EPS, so it is not possible to prevent contact between the drain valve 1280 and air by the EPS. In contrast, insulator 1210 formed of PU and formed through a foaming process does not have any gaps, and thus, it can prevent contact between the drain valve 1280 and air.

The foaming process may be performed in a foaming jig, and the insulator 1210 of the present disclosure may be formed through a process called nude foaming. The foaming process is performed as follows.

The cooling water accommodation unit 1220 and the drain valve 1280 are assembled and subsequently introduced to a foaming jig. Thereafter, a crude liquid (for example, a bubble solution formed as a mixture of polyurethane and a foaming agent) of the insulator 1210 is introduced to the foaming jig and a foaming process is performed. When the foaming process is completed, the insulator 1210 surrounding an outer circumferential surface of the cooling water accommodation unit 1220 is formed. The insulator 1210 formed through the foaming process covers even the drain valve 1280, as well as the cooling water accommodation unit 1220.

The cooling water accommodation unit 1220 includes a barrier 1221 to prevent the bubble solution from overflow during the foaming process. The barrier 1221 protrudes along an outer circumferential surface of an upper portion of the cold water tank assembly 1200. The barrier 1221 protruding from the cold water tank assembly 1200 may be in contact with an inner circumferential surface of the foaming jig to prevent overflow of the bubble solution introduced to the foaming jig.

When the foaming process is completed, the cooling water accommodation unit 1220, the drain valve 1280, and the insulator 1210 are integrally formed. Insulator 1210 is disposed in a position spaced apart from cover 1010. Here, cover 1010 may be at least one of the front cover 1011, the side panel 1013a, and the rear cover 1014 depending on an installation position of the cold water tank assembly 1200. With respect to the position of the cold water tank assembly 1200 described above with reference to FIG. 2, the cover 1010 herein refers to the rear cover 1014. However, the present disclosure is not limited thereto.

Since insulator 1020 and rear cover 1014 are spaced apart from each another, an air gap 1230 is formed between an outer circumferential surface of the insulator 1210 and an inner circumferential surface of the rear cover 1014. The air gap 1230 additionally cold-insulates the cold water tank assembly 1200. Compared with a structure in which the insulator 1210 is in contact with the rear cover 1014, a structure in which the air gap 1230 separates the insulator 1210 and the rear cover 1014 is more advantageous for cold-insulating the cold water tank assembly 1200. The reason is because the air gap 1230 restricts heat conduction.

The air gap 1230 may additionally cold-insulate the cold water tank assembly 1200, but when the drain valve 1280 is exposed to the air gap 1230, formation of dew on the drain valve 1280 may not be prevented. In order to prevent formation of dew on the drain valve 1280, an outer circumferential surface of the drain valve 1280 is continuously covered by the insulator 1210 and the rear cover 1014. Since the drain valve 1280 is continuously covered by the insulator 1210 and the rear cover 1014, even though the air gap 1230 is present between the rear cover 1014 and the insulator 1210, the drain valve 1280 is not exposed to the air gap 1230.

Referring to FIG. 4, the water dispenser 1000 may include a support 1031 formed to cover a lower portion of the cold water tank assembly 1200. The support 1031 separates the insulator 1210 and the rear cover 1014 to form the air gap 1230. In order to avoid the formation of dew on the drain valve 1280, an outer circumferential surface of the drain valve 1280 may be continuously covered by the insulator 1210, the support 1031, and the cover 1010.

Although the air gap 1230 is present, the structure in which the drain valve 1280 is continuously covered by the insulator 1210 and the cover 1010 and the structure in which the drain valve 1280 is continuously covered by the insulator 1210, the support 1031, and the cover 1010 may prevent the drain valve 1280 from being exposed to the air gap 1230. Thus, formation of dew on the outer circumferential surface of the drain valve 1280 may be prevented in spite of the presence of the air gap 1230 in the present disclosure.

Figure 5:
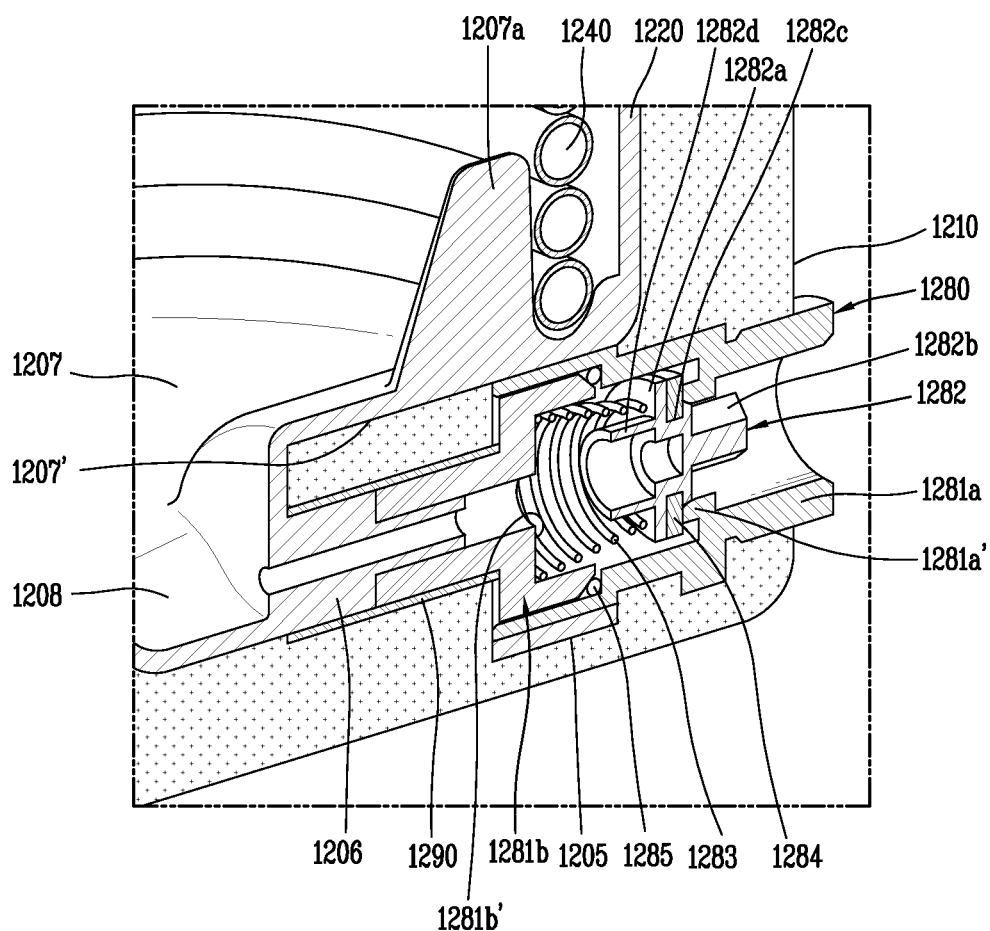
FIG. 5 is a detailed cross-sectional view illustrating a drain valve of the water dispenser related to embodiment 1-1.

FIG. 5 is a detailed cross-sectional view illustrating the drain valve 1280 of the water dispenser related to embodiment 1-1.

The cooling water accommodation unit 1220 includes a protruding drain flow channel 1206 connected to the drain valve 1280. The protruding drain flow channel 1206 protrudes from a lower portion of the cooling water accommodation unit 1220. The protruding drain flow channel 1206 protrudes in a direction outwardly from the cooling water accommodation unit 1220.

With respect to a flow of drained cooling water, the anti-pooling drain part 1208, the protruding drain flow channel 1206, and the drain valve 1280 form a continuous cooling water drain flow channel. When cooling water is drained, cooling water sequentially passes through the anti-pooling drain part 1208, the protruding drain flow channel 1206, and the drain valve 1280 so as to be discharged outwardly.

The drain valve 1280 includes housings 1281a and 1281b, a press operating part 1282, an elastic member 1283, a first O-ring 1284, and a second O-ring 1285.

Housings 1281a and 1281b form an appearance of the drain valve 1280. In FIG. 5, an appearance of the housings 1281a and 1281b is illustrated to have a cylindrical shape having a step formed on an outer circumferential surface thereof. However, the present disclosure is not limited to the appearance of the housings 1281a and 1281b.

Housings 1281a and 1281b have a hollow part. The hollow part corresponds to a drain flow channel draining cooling water and also corresponds to a space accommodating the press operating part 1282 and the elastic member 1283.

As discussed above, the housings 1281a and 1281b are surrounded by the insulator 1210. Since the insulator 1210 surrounds the housings 1281a and 1281b, the housings 1281a and 1281b may be prevented from being in contact with air. Thus, although cold cooling water is drained through the hallow part, the housings 1281a and 1281b are not in contact with air. Through this structure, formation of dew on the drain valve 1280 may be prevented.

Housings 1281a and 1281b are formed by coupling a first housing 1281a and a second housing 1281b. When any one of the first housing 1281a and the second housing 1281b is inserted into the other, the first housing 1281a and the second housing 1281b are coupled. In FIG. 5, it is illustrated that the second housing 1281b is inserted into the first housing 1281a.

First housing 1281a corresponds to an outlet though which cooling water is discharged from the drain valve 1280. Meanwhile, the second housing 1281b corresponds to an inlet through which cooling water is received from the cooling water accommodation unit 1220. Thus, with respect to a flow of cooling water drained from the cooling water accommodation unit 1220, the first housing 1281a is disposed on a downstream side, relative to the second housing 1281b.

Press operating part 1282 is disposed within the housings 1281a and 1281b. The inside of the housings 1281a and 1281b refers to a hollow part. The press operating part 1282 is pressed by a user. The user's pressing operation is to open and close a drain flow channel of the drain valve 1280.

The first O-ring 1284 seals to fill a space between the press operating part 1282 and the first housing 1281a. The first O-ring 1284 is coupled to the press operating part 1282 and tightly attached to the housing by elastic force provided by the elastic member 1283. The first O-ring 1284 is formed of a material having elasticity. Since the first O-ring 1284 seals to fill a space between the press operating part 1282 and the first housing 1281a, closing of a drain flow channel is implemented.

The elastic member 1283 provides elastic force enabling the press operating part 1282 to be tightly attached to the first housing 1281a. The elastic member 1283 is disposed on an upstream side, relative to the press operating part 1282, and supported by the second housing 1281b.

The second O-ring 1285 is formed to have an annular shape. The second O-ring seals a connection portion between the first housing 1281a and the second housing 1281b. The second O-ring 1285 is formed of a material having elasticity.

An end portion of the protruding drain flow channel 1206 is formed to have a size that can be inserted into the hollow portion of the second housing 1281b. An outer circumferential surface of the protruding drain flow channel 1206 has a step. The second housing 1281b is formed to accommodate the end portion of the protruding drain flow channel 1206 and surrounds an outer circumferential surface of the protruding drain flow channel 1206. The second housing 1281b is limited in movement by the step of the protruding drain flow channel 1206. Thus, the step of the protruding drain flow channel 1206 serves to set a position of the second housing 1281b.

Referring to FIG. 5, fixing part 1205 is formed to surround only a portion of the outer circumferential surface of the drain valve 1280, rather than surrounding the entirety of the protruding drain flow channel 1206 and the drain valve 1280. Accordingly, the drain valve 1280 is visually exposed from a lower end of the cold water tank assembly 1200.

In detail, an outer bottom surface 1207' of the cooling water accommodation unit 1220 partially surrounds the protruding drain flow channel 1206 in a position spaced apart from the outer circumferential surface of the protruding drain flow channel 1206. Here, the outer bottom surface of the cooling water accommodation unit 1220 refers to a surface opposing the inner bottom surface 1207 denoted by reference numeral 1207 in FIG. 5.

When the cold water tank assembly 1200 is viewed in a direction in which the drain valve 1280 is coupled to the protruding drain flow channel 1206, the outer bottom surface 1207' of the cooling water accommodation unit 1220 may partially have an arch-shaped cross-section to partially surround the protruding drain flow channel 1206. The reason why the outer bottom surface 1207' is spaced apart from the protruding drain flow channel 1206 is to provide a space for disposing the drain valve 1280 and a sealing member 1290. Also, the reason why the outer bottom surface 1207' surrounds a portion of the protruding drain flow channel 1206, rather than the entirety thereof, is to expose the protruding drain flow channel 1206 though the other remaining portion not surrounded by the outer bottom surface 1207'.

Fixing part 1205 protrudes from the outer bottom surface of the cold water tank assembly 1200 to partially surround the drain valve 1280. Fixing part 1205 has an arch shape and the outer bottom surface 1207' of the cooling water accommodation unit 1220 and the fixing part 1205 form an edge of a hole.

The fixing part surrounds the drain valve 1280 in a position not covering the connection portion between the protruding drain flow channel 1206 and the drain valve 1280. Since the protruding drain flow channel 1206 are surrounded by the sealing member 1290, it may be understood that the fixing part 1205 surrounds the drain valve 1280 in a position not covering the sealing member 1290. A hole formed by the outer bottom surface 1207' of the cooling water accommodation unit 1220 and the arch-shaped fixing part 1205 faces the outlet of the protruding drain flow channel 1206.

The structure allows for visually checking whether the protruding drain flow channel 1206 and the drain valve 1280 are properly connected and whether sealing is properly made by the sealing member 1290, before the foaming process. When the foaming process is completed, the sealing member 1290 is covered by the insulator 1210.

The first housing 1281a and the second housing 1281b may be coupled in a manner such as screw fastening, press-fitting, hook fastening, and the like. Any one of the first housing 1221 and the second housing 1281b may surround an outer circumferential surface of the other. For example, referring to FIG. 5, the first housing 1281a surrounds an outer circumferential surface of the second housing 1281b.

The second housing 1281b has a sloped surface in a portion coupled to the first housing 1281a. Due to the sloped surface of the second housing 1281b, a gap is formed between the second housing 1281b and the first housing 1281a. The second O-ring 1285 is inserted into the gap to seal the connection portion between the first housing 1281a and the second housing 1281b. The second O-ring 1285 prevents leakage of cooling water through the connection portion between the first housing 1281a and the second housing 1281b.

The first housing 1281a has a first arrest protrusion 1281a'. The second housing 1281b has a second arrest protrusion 1281b'. With respect to a flow of drained cooling water, the first housing 1281a is disposed on a downstream side of the second housing 1281b, and thus, the arrest protrusion 1281a' may be referred to as a downstream side arrest protrusion 1281a' and the second arrest protrusion 1281b' may be referred to as an upstream side arrest protrusion 1281b'.

The first arrest protrusion 1281a' protrudes from an inner circumferential surface of the first housing 1281a. The first arrest protrusion 1281a' protrudes along the inner circumferential surface of the first housing 1281a and substantially has an annular shape.

The press operating part 1282 may have a first portion 1282a and a second portion 1282b. Since a flow of cooling water is blocked by the first arrest protrusion 1281a' in a state in which the drain valve 1280 is closed, an interior and an exterior of the drain valve 1280 may be differentiated on the basis of the first arrest protrusion 1281a'. Under the differentiation, the first portion 1282a of the press operating part 1282 refers to a portion disposed within the drain valve 1280 and the second portion 1282b refers to a portion outwardly exposed from the drain valve 1280.

The first portion 1282a is disposed to be caught by the arrest protrusion 1281a'. The first portion 1282a may substantially be formed in the form of a plate. However, the first portion 1282a may have any other shape. For example, the first portion 1282a may have a disk plate shape or a polygonal plate shape.

The first portion 1282a is formed be larger than a cooling water discharge hole defined by the first arrest protrusion 1281a'. Thus, the first portion 1282a may be caught by the first arrest protrusion 1281a'. Although elastic force is provided to the press operating part 1282 from the elastic member 1283, movement of the press operating part 1282 is restricted by the first arrest protrusion 1281a'. Thus, the press operating part 1282 may not be released from the interior of the housing 1281a due to the presence of the first arrest protrusion 1281a'.

The second portion 1282b is exposed outwardly and pressed. Here, the pressing operation refers to physical pressing for opening and closing the drain valve 1280. The second portion 1282b protrudes from the first portion 1282a to outside of the drain valve 1280. The second portion 1282b is visually exposed outwardly. The second portion 1282b is surrounded by the first arrest protrusion 1281a'. The second portion 1282b may be in contact with the first arrest protrusion 1281a' or may not.

The first O-ring 1284 is installed between the arrest protrusion 1281a' and the press operating part 1282. The first O-ring 1284 is coupled to an outer circumferential surface of the press operating part 1282. The press operating part 1282 has a circular recess 1282c formed along an outer circumferential surface between the first portion 1282a and the second portion 1282b. The first O-ring 1284 is inserted into the circular recess 1282c.

The first portion 1282a is provided with elastic force from the elastic member 1283. The first O-ring 1284 is pressed by the first portion 1282a and tightly attached to the first arrest protrusion 1281a'. When the first O-ring 1284 is tightly attached to the first arrest protrusion 1281a', the drain valve 1280 is closed. When the user presses the press operating part 1282 toward the elastic member 1283 by applying external force to the second portion 1282b, the first O-ring 1284 tightly attached to the second arrest protrusion 1281a' is separated from the first arrest protrusion 1281a' and the drain valve 1280 is opened. Opening of the drain valve 1280 is implemented by the external force applied to the press operating part 1282, and closing of the drain valve 1280 is implemented by elastic force provided by the elastic member 1283.

The second arrest protrusion 1281b' is formed in the hollow portion of the second housing 1281b. An inner circumference of the second housing 1281b is not uniform in size and there are a region in which a size of the circumference is relatively large and a region in which a size of the circumference is relatively small. The hollow portion of the second housing 1281b is varied in size with respect to the second arrest protrusion 1281b'. A difference in size between the circumferences forms the second arrest protrusion 1281b'.

The elastic member 1283 is installed in a position supported by the second arrest protrusion 1281b' of the second housing 1281b. The press operating part 1282 may have a boss portion 1282d protruding toward the elastic member 1283 from the first portion 1282a. The elastic member 1283 may be formed to surround an outer circumferential surface of the boss portion 1282d. Since movement of the elastic member 1283 is limited by the boss portion 1282d, the boss portion 1282d may prevent the elastic member 1283 from being released from a normal position thereof.

The first portion 1282a of the press operating part 1282 has a first surface and a second surface. The first surface and the second surface face in substantially the opposite directions. The elastic member 1283 is tightly attached to the first surface, and the first O-ring 1284 is coupled to the second surface. When the elastic member 1283 presses the first surfaces, the first O-ring 1284 is pressed and tightly attached to the first arrest protrusion 1281a' by the second surface.

The mechanical drain valve 1280 is a concept distinguished from an electronic valve. For example, an electronic valve such as a solenoid valve is operated according to an input of an electrical signal. In contrast, the mechanical drain valve 1280 is operated by applying a physical force.

The electronic valve, when exposed to water, may be abnormally operated or broken down. In order to apply the electronic valve to a water dispenser, the electronic valve should be disposed in a position as distant as possible from water. However, when the electronic valve is disposed in a position distant from water, dew is formed on a surface of the electronic valve or a pipe connected to the electronic valve, or the like.

In contrast, the mechanical drain valve 1280 does not require an electrical signal. Thus, the mechanical drain valve 1280 is not vulnerable to water and may be advantageously disposed to be adjacent to water. In FIG. 5, it can be seen that the mechanical drain valve 1280 is directly connected to the cold water tank assembly 1200.

In order to surround both the cold water tank assembly 1200 and the drain valve 1280 with the insulator 1210, the cold water tank assembly 1200 and the drain valve 1280 should not be away from each other. If an electronic valve is applied to a water dispenser, the electronic valve is inevitably spaced apart from the cold water tank assembly 1200, and thus, both the cold water tank assembly 1200 and the electronic valve cannot be covered with the insulator 1210.

However, the drain valve 1280 and the cold water tank assembly 1200 may be disposed to be adjacent to each other by applying the mechanical drain valve 1280 and both the cold water tank assembly 1200 and the drain valve 1280 may be covered with the insulator 1210. Covering the drain valve 1280 with the insulator 1210 refers to blocking contact with air to eventually prevent formation of dew.

Since the cold water tank assembly 1200 and the drain valve 1280 are directly connected, the water dispenser does not require a pipe for connecting the cold water tank assembly 1200 and the drain valve 1280. Dew may be formed on a pipe in which cooling water flows. However, not requiring such a pipe means fundamentally eliminating a factor causing formation of dew.

Figure 6:
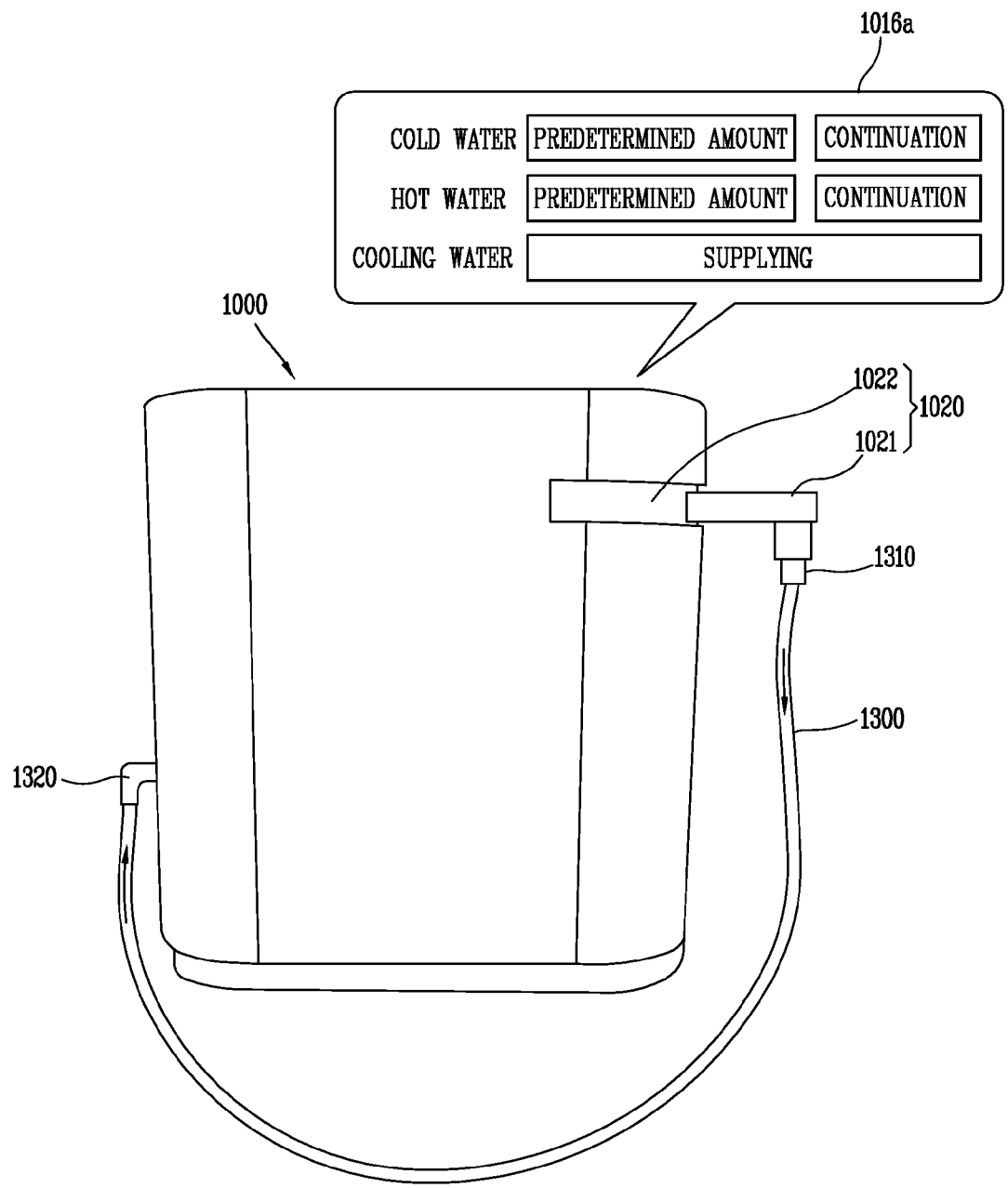
FIG. 6 is a conceptual view illustrating that a water ejection unit for supplying cooling water to a cooling water accommodation unit and a drain valve are connected by a hose in the water dispenser related to embodiment 1-1.

FIG. 6 is a conceptual view illustrating that a water ejection unit 1020 for supplying cooling water to the cooling water accommodation unit 1220 (please refer to FIGS. 3 to 5) and the drain valve 1280 are connected by a hose in the water dispenser 1000 related to embodiment 1-1.

The water dispenser 1000 includes a cooling water flow channel connected to the cold water tank assembly 1200 (please refer to FIGS. 3 and 4) in order to supply raw water or purified water to the cooling water accommodation unit 1220.

In the present disclosure, embodiments are differentiated according to ways in which cooling water is supplied, and a configuration of the cooling water flow channel may be varied according to embodiments.

The water dispenser illustrated in FIG. 6 is classified as embodiment 1-1. In embodiment 1-1, at least a portion of the cooling water flow channel is formed by a hose 1300 exposed outwardly from the main body of the water dispenser 1000.

Hose 1300 is configured to supply purified water ejected through the dispensing unit 1020 to a cooling water accommodation unit 1220 (please refer to FIG. 4). One end 1310 of the hose 1300 is connected to the dispensing unit 1020 and the other end 1320 of the hose 1300 is connected to the drain valve 1280. The hose 1300 is detachably coupled to the dispensing unit 1020 and the drain valve 1280. Accordingly, purified water discharged from the dispensing unit 1020 may be introduced to the cooling water accommodation unit 1220 through the hose 1300 and the drain valve 1280.

An input unit 1016a provided in the water dispenser 1000 is formed to receive a control command. The control command includes a command for dispensing cold water or hot water from the water dispenser 1000 or a command for supplying cooling water to the cooling water accommodation unit 1220.

For example, when the user presses a predetermined amount button of cold water/hot water, a control command for dispensing a predetermined amount of cold water/hot water is input to the water dispenser 1000, and a predetermined amount of cold water/hot water is dispensed from the water dispenser 1000. Similarly, when the user presses a continuation button of cold water/hot water, a control command for continuously dispensing cold water/hot water is input to the water dispenser 1000, and the water dispenser 1000 continuously dispenses cold water/hot water until the continuation button of cold water/hot water is pressed again or a separate control command is input.

Also, when the user presses a button for supplying cooling water, a control command for dispensing a preset amount of cooling water is input to the water dispenser 1000, and the preset amount of purified water (room temperature purified water, cold water, hot water) is dispensed from the water dispenser 1000. In the present disclosure, cooling water may be formed using raw water or purified water, and in the embodiment 1-1, cooling water is supplied through the dispensing unit 1020, and thus, cooling water in the embodiment 1-1 is formed by purified water. In particular, it is considered that cooling water serves to cool purified water, cooling water in the embodiment 1-1 is formed by cold water among cold water and hot water.

A control command for dispensing cold water/hot water and a control command for supplying cooling water should be differentiated. This is because an amount of cold water/hot water for the drinking purpose and an amount of purified water for filling cooling water are different. In order to differentiate the control commands, the input unit 1016a may include input buttons configured to receive different control commands as illustrated in FIG. 6.

Normally, the hose 1300 is not required for an operation of the water dispenser. However, in a case where cooling water is intended to be replaced, an operation of connecting the hose 1300 to the dispensing unit 1020 and the drain valve 1280 is first performed in the water dispenser of the embodiment 1-1. This is because a cooling water flow channel is required for supplying cooling water and at least a portion of the cooling water flow channel is formed by the hose 1300. Additionally, since existing cooling water filled in the cooling water accommodation unit 1220 should be discharged before supplying cooling water, connection of the hose 1300 should be made after discharging existing cooling water.

Although cooling water is formed by purified water (specifically, cold water), it may not be desirable to dispense cooling water by pressing a cooling water supply button in a state in which the hose 1300 is not connected. This is because, an amount of cold water/hot water dispensed when the predetermined amount button of cold water/hot water is pressed and an amount of purified water (purified water having room temperature, cold water, or hot water) dispensed when the cooling water supply button is pressed are different. Thus, in a state in which the hose 1300 is not connected, the cooling water supply button is preferably deactivated.

When the cooling water supply button is deactivated, although the user unconsciously presses the cooling water supply button, cooling water is not dispensed. For example, the water dispenser 1000 may be configured to recognize connection of the hose 1300, and in this case, in a state in which the hose 1300 is not connected, although the user presses the cooling water supply button, cooling water is not dispensed. Or, when the cooling water supply button is pressed after the cooling water supply button is activated, the water dispenser 1000 may dispense cooling water. Also, in this case, unless the user sequentially executes operations of connecting the hose 1300, activating the cooling water supply button, and pressing the cooling water supply button, cooling water is not dispensed.

Figure 7:
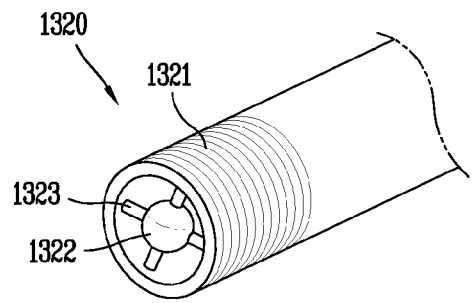
FIG. 7 is a conceptual view of a hose connected to the drain valve of the water dispenser related to embodiment 1-1.

FIG. 7 is a conceptual view illustrating the other end 1320 of the hose 1300 connected to the drain valve 1280 of the water dispenser related to the embodiment 1-1.

A coupling part 1321 such as thread or a protrusion may be formed on an outer circumferential surface of the other end 1320 of the hose 1300. When the thread is formed on the outer circumferential surface of the other end 1330 of the hose 1300, the drain valve 1280 has a threaded rod corresponding to the thread. Accordingly, the hose 1300 and the drain valve 1280 may be threaded. In a case in which a protrusion is formed on the outer circumferential surface of the other end 1320 of the hose 1300, when the hose 1300 is coupled to the drain valve 1280 by a frictional force based on the protrusion, the hose 1300 may be prevented from being arbitrarily separated from the drain valve 1280.

Drain valve 1280 described above with reference to FIG. 5 is configured to be opened by physically pressing the press operating part 1282 (please refer to FIG. 5). Here, when the hose 1300 is connected to the drain valve 1280, the press operating part 1282 is concealed by the hose 1300, making it impossible for the user to arbitrarily pressing the press operating part 1282. Thus, in order to open the drain valve 1280, the hose 1300 having a structure allowing the pressing part to be pressed should be provided.

The hose 1300 has a structure allowing the press operating part to be pressed includes a pressing part 1322 and connection parts 1323.

Pressing part 1322 is formed in a hollow part of the hose 1300. Pressing part 1322 is configured to press the press operating part 1282 when the hose 1300 is coupled to the drain valve 1280. Pressing the press operating part 1282 refers to moving the press operating part to an inner side of the drain valve 1280 to open the drain valve 1280.

The connection parts 1323 are radially formed around the pressing part 1322 and connect the pressing part 1322 to an inner circumferential surface of the hose 1300. Since the connection parts 1323 are radially formed, there is a space between the inner circumferential surface of the hose 1300 and the pressing part 1322 for cooling water to be supplied therethrough.

Figure 8:
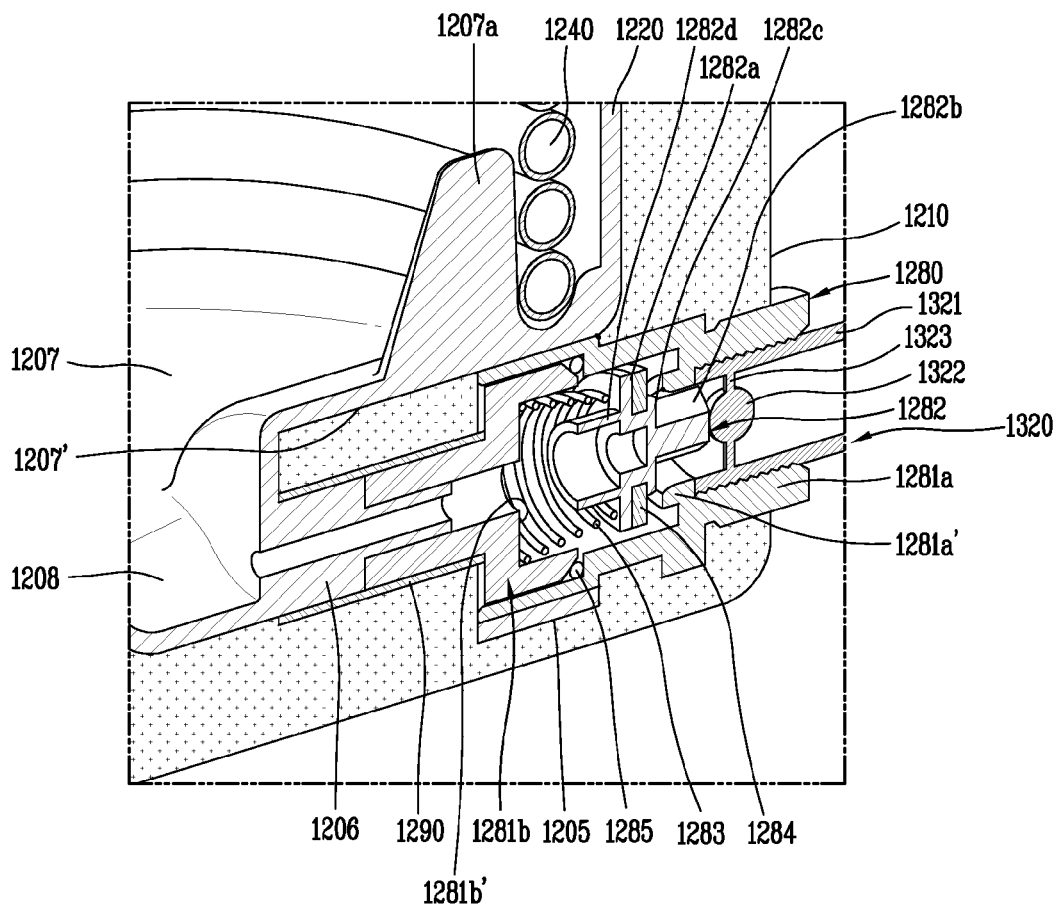
FIG. 8 is a cross-sectional view illustrating a configuration in which the drain valve and the hose are connected in the water dispenser related to embodiment 1-1.

FIG. 8 is a cross-sectional view illustrating a configuration in which the drain valve 1280 and the hose 1300 are connected in the water dispenser related to the embodiment 1-1.

When the hose 1300 is connected to the drain valve 1280, the pressing part 1322 of the hose 1300 press the press operating part 1282 to an inner side of the drain valve 1280 in a position facing the press operating part 1282 of the drain valve 1280. Since an external force applied by the pressing part 1322 is greater than a restoring force of the elastic member 1283 elastically supporting the press operating part 1282, the press operating part 1282 is moved in a direction in which the elastic member 1283 is compressed.

When the press operating part 1282 is moved to be spaced apart from the first arrest protrusion 1281*a*', a space is formed between the press operating part 1282 and the first arrest protrusion 1281*a*' and cooling water may be supplied to the cooling water accommodation unit 1220 therethrough.

In the structure of the embodiment 1-1 described above, after cooling water is discharged from the cooling water accommodation unit 1220, the hose 1300 is coupled to the drain valve 1280, thereby completing preparation for supplying cooling water.

Figure 9:
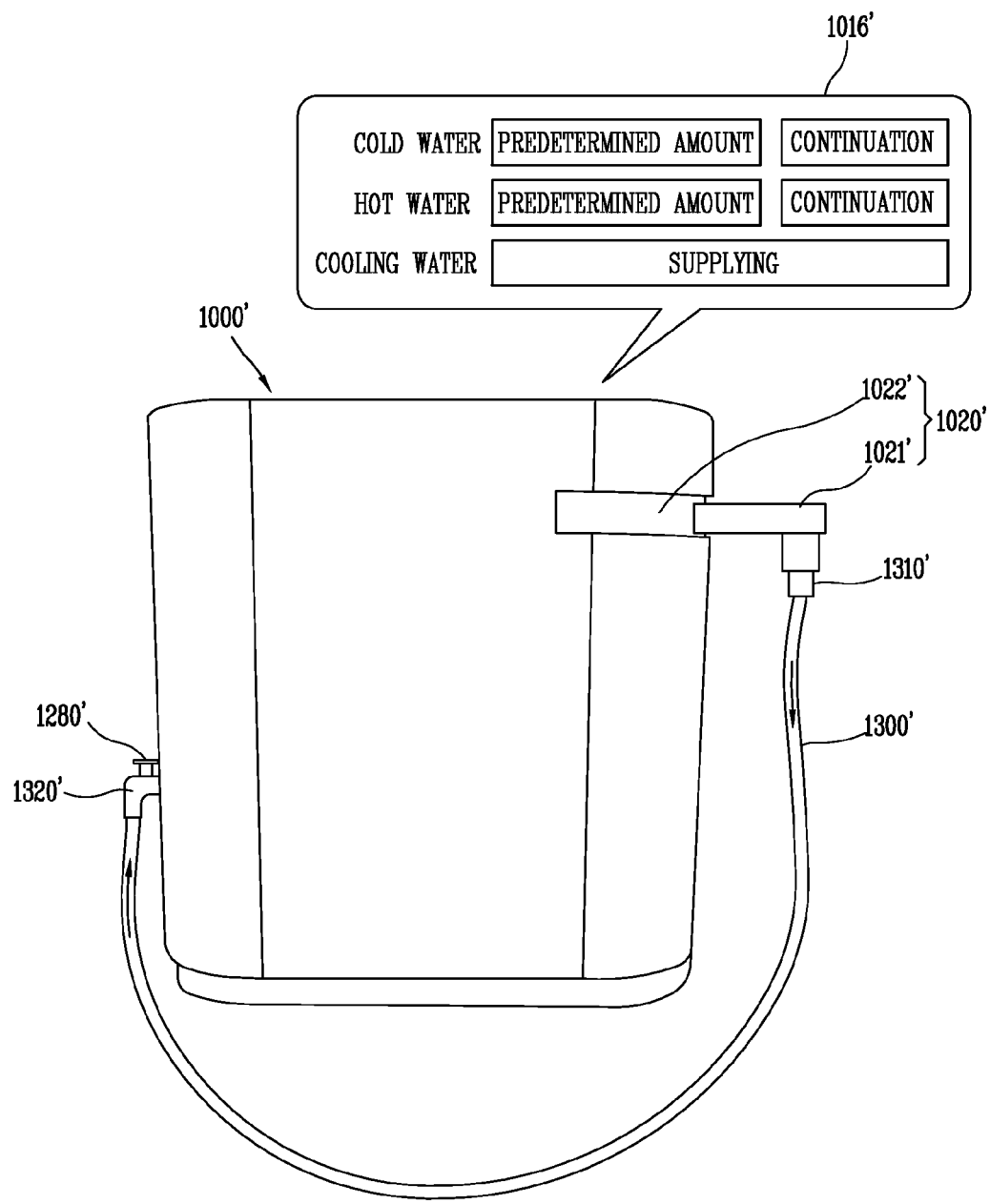
FIG. 9 is a conceptual view illustrating that a dispensing unit for supplying cooling water to a cooling water accommodation unit and a drain valve are connected by a hose in the water dispenser related to embodiment 1-2.

FIG. 9 is a conceptual view illustrating that a dispensing unit 1020' for supplying cooling water to a cooling water accommodation unit and a drain valve 1280' are connected by a hose 1300' in the water dispenser related to embodiment 1-2.

Unlike the drain valve 1280 described in the embodiment 1-1, the drain valve 1280' of the embodiment 1-2 is exposed to the outside of the main body of the water dispenser 1000'. The drain valve 1280', exposed to the outside of the main body of the water dispenser 1000', is configured to be opened by an external force applied by the user, and so on. For example, the drain valve 1280' may be configured as a gate valve or a cock valve which is manually opened or closed. In the embodiment 1-2, the structure of the drain valve 1280' and the hose 1300' described above with reference to FIGS. 4 to 6, 7, and 8 is not required.

In the embodiment 1-2, the structure of the drain valve 1280' and the hose 1300' is different from that of the embodiment 101. Thus, unlike the embodiment 1-1, in the embodiment 1-2, preparation for supply of cooling water is not completed until an operation of opening the drain valve 1280' is additionally performed by operating the drain valve 1280' after an operation of connecting the hose 1300' to the drain valve 1280'.

Figure 10:
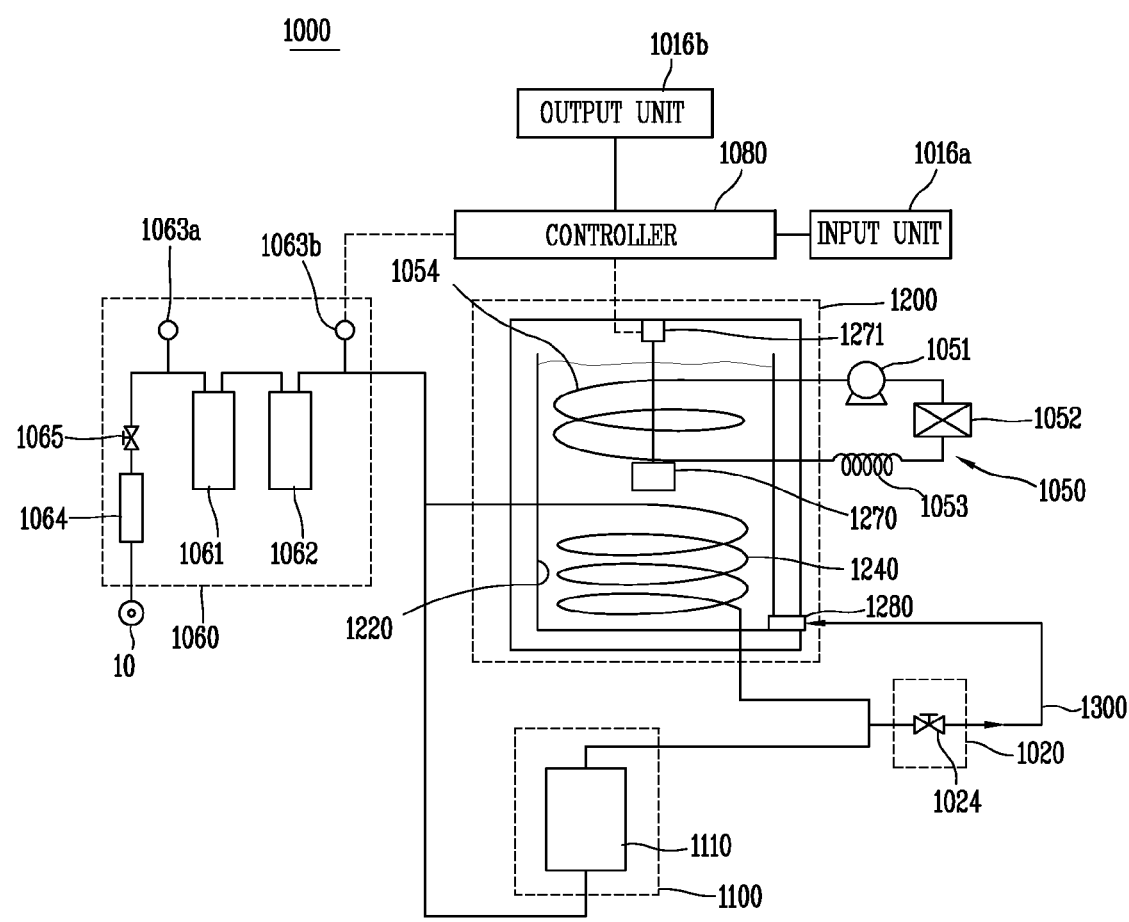
FIG. 10 is a conceptual view illustrating a water dispenser of embodiment 1-1 and embodiment 1-2.

FIG. 10 is a conceptual view illustrating the water dispenser 1000 of the embodiment 1-1 and the embodiment 1-2. Water dispenser 1000 of embodiment 1-1 and water dispenser 1000 of embodiment 1-2 are the same, except for the structure of the drain valve 1280 and the hose 1300, and thus, may be described together with reference to FIG. 10.

(1) Dispensing cold water and hot water.

Water dispenser 1000 receives a filtration target raw water from a raw water supply unit 10. The raw water supplied from the raw water supply unit 10 is formed as tap water or underground water. Water in a state prior to filtration by the water dispenser 1000 may be termed raw water, regardless of type of water.

A pre-filter 1064 configured to previously remove a contaminant from raw water supplied from the raw water supply unit 10 may be installed on a most upstream side of the filter unit 1060. The concept of an upstream side or a downstream side is based on a flow of water. For example, raw water is supplied from the raw water supply unit 10 to the pre-filter 1064 in relation to FIG. 10, the pre-filter 1064 corresponds to a downstream side of the raw water supply unit 10. Similarly, since the pre-filter 1064 is disposed to first receive raw water in the filter unit 1060, the pre-filter 1064 may be described as being installed on the most upstream side of the filter unit 1060.

Particles included in raw water may degrade efficiency of the unit filters 1061 and 1062. However, when the pre-filter 1064 is disposed on the upstream side of the unit filters 1061 and 1062 to first remove large particles included in raw water, raw water not including large particles may be supplied to the unit filters 1061 and 1062, thus protecting the unit filters 1061 and 1062.

A raw water valve 1065 may be installed on an upstream side or a downstream side of the pre-filter 1064. In FIG. 10, the raw water valve 1065 is installed on the downstream side of the pre-filter 1064, but it may also be installed on an upstream side of the pre-filter 1064.

Raw water valve 1065 is configured to control supply of raw water. Raw water valve 1065 may be configured as a gate valve, a cock valve, and the like, which are manually opened and closed or may be configured as a solenoid valve, or the like, which is automatically opened and closed.

Flow rate sensors 1063a and 1063b configured to measure a flow rate of raw water are installed on a downstream side of the raw water valve 1065 and on a downstream side of the unit filters 1061 and 1062. In order to differentiate between the two flow rate sensors 1063a and 1063b, the flow rate sensor installed on the upstream side of the unit filters 1061 and 1062 may be referred to as a first flow rate sensor 1063a and the flow rate sensor installed on the downstream side of the unit filters 1061 and 1062 may be referred to as a second flow rate sensor 1063b.

The unit filters 1061 and 1062 are configured to filter out a contaminant from raw water to produce purified water. With respect to the unit filters 1061 and 1062, water flowing in the upstream of the unit filters 1061 and 1062 may be classified as raw water and water flowing in the downstream of the unit filters 1061 and 1062 may be classified as purified water.

The second flow rate sensor 1063b may be configured to measure a flow rate of purified water supplied from the unit filters 1061 and 1062. Here, any one of the first and second flow rate sensors 1063a and 1063b may be installed. This is because, in the flow channel configuration of FIG. 10, a flow rate of raw water measured in the first flow rate sensor 1063a and a flow rate of purified water measured in the second flow rate sensor 1063b are theoretically equal. Thus, when a flow rate sensor is simply mentioned without differentiation between the first flow rate sensor 1063a and the second flow rate sensor 1063b, it may be understood as indicating any one of the first flow rate sensor 1063a and the second flow rate sensor 1063b. First flow rate sensor 1063a and/or second flow rate sensor 1063b are used to measure an amount of cooling water filled in the cooling water accommodation unit 1220.

Water dispenser 1000 may be configured to dispense purified water produced by the filter unit 1060 at room temperature. For example, as an outlet of the filter unit 1060 and the dispensing unit 1020 are connected by a pipe, purified water produced in the filter unit 1060 may be discharged at room temperature to the dispensing unit 1020. Or, if the refrigerating cycle device 1050 or the induction heating module 1110 does not operate while the purified water produced in the filter unit 1060 is passing through the cold water generating flow channel 1240 or the heating device 1100, the purified water may be dispensed at room temperature.

Also, the water dispenser 1000 may be configured to heat purified water produced in the filter unit 1060 to produce hot water, or cool purified water to produce cold water.

Heating device 1100 is installed on a downstream side of the filter unit 1060. Heating device 1100 has equipment for heating purified water, such as the induction heating module 1110, or the like. Heating device 1100 is formed to heat purified water to produce hot water. Passing through the heating device 1100, the purified water is heated to have a high temperature within a short time.

Dispensing unit 1020 is installed on a downstream side of the heating device 1100. Dispensing unit 1020 has a valve 1024, and the valve 1024 may be opened and closed on the basis of a hot water/cold water dispensing control command applied through the input unit 1016a. When the user applies a hot water dispensing control command to the input unit 1016a, the valve 1024 is opened and hot water is dispensed.

Similarly, the cold water tank assembly 1200 is installed on a downstream side of the filter unit 1060. Cold water tank assembly 1200 has the cooling water accommodation unit 1220 formed to accommodate cooling water. Cooling water accommodation unit 1220 is filled with cooling water.

Evaporator 1054, stirrer 1270, and cold water generating flow channel 1240 are installed on an inner side of the cold water tank assembly 1200. Each of the evaporator 1054, the stirrer 1270, and the cold water generating flow channel 1240 are immersed in the cooling water. Compressor 1051, condenser 1052, expansion device 1053, and evaporator 1054 of the refrigerating cycle device 1050 are sequentially connected and circulate a refrigerant to maintain cooling water at a low temperature.

Cooling water cooled by a refrigerant cools purified water passing through the cold water generating flow channel 1240, and purified water, while passing through the cold water generating flow channel 1240, is cooled within a short time. Purified water cooled by cooling water turns to cold water. Stirrer 1270 is configured to rotate in a state of being immersed in cooling water to accelerate heat exchange between a refrigerant and cooling water and heat exchange between cooling water and purified water.

Cold water generated by the cold water tank assembly 1200 is discharged to the outside through the dispensing unit 1020 installed on a downstream side of the cold water tank assembly 1200.

As described above, in order to replace cooling water filled in the cooling water accommodation unit 1220, first, cooling water already filled in the cooling water accommodation unit 1220 should be drained. When a technical service expert or the user (hereinafter, referred to as the "user", and so on) opens the drain valve 1280, cooling water filled in the cooling water accommodation unit 1220 is drained through the drain valve 1280.

After draining of the cooling water is completed, when the hose 1300 is connected to the dispensing unit 1020 and the drain valve 1280, purified water or cold water discharged through the dispensing unit 1020 is ready to be introduced to the cooling water accommodation unit 1220 through the drain valve 1280.

Thereafter, when a cooling water supply control command is applied to the input unit 1016a, purified water or cold water is supplied to the cooling water accommodation unit 1220 through the cooling water flow channel. In FIG. 10, the cooling water flow channel is formed by a flow channel connected from the raw water supply unit 10 to the filter unit 1060, the cold water generating flow channel 1240, the dispensing unit 1020, the hose 1300, and the drain valve 1280.

When the refrigerating cycle device 1050 operates while purified water discharged from the filter unit 1060 is passing through the cold water generating flow channel 1240, cold water is generated and supplied to the cold water accommodation unit 1220 through the hose 1300. Meanwhile, when the refrigerating cycle device 1050 does not operate while purified water discharged from the filter unit 1060 is passing through the cold water generating flow channel 1240, purified water at room temperature is supplied to the cooling water accommodation unit 1220 through the hose 1300. Thus, cooling water filled in the cooling water accommodation unit 1220 is formed by purified water having room temperature or cold water. Unless otherwise mentioned, a concept of purified wafer includes all of purified water at room temperature, cold water, and hot water.

A flow rate of cooling water filled in the cooling water accommodation unit 1220 is designated as a pulse value in a first flow rate sensor 1063a and/or a second flow rate sensor 1063b. With respect to FIG. 10, a flow rate of cooling water is designated as a pulse value in the second flow rate sensor 1063b. When a flow rate corresponding to the designated pulse value passes through the second flow rate sensor 1063b, supply of purified water is stopped. Controller 1080 is configured to control the flow rate sensor and stop supply of purified water on the basis of a supply amount measured by the flow rate sensor. Accordingly, a preset flow rate of cooling water may be supplied to the cooling water accommodation unit 1220.

The preset flow rate refers to a flow rate corresponding to a water level at which all of the cold water generating flow channel 1240, the stirrer 1270, and the evaporator 1054 installed on the inner side of the cold water tank assembly 1200 may be immersed. Supply of purified water to the cooling water accommodation unit 1220 is stopped on the basis of a water supply amount measured by the flow rate sensor. Such an operation of the water dispenser 1000 may be controlled by the controller 1080.

Controller 1080 is configured to determine whether cooling water has been filled up to a reference water level on the basis of a rotation speed of the stirrer 1270 per unit time. Here, the reference water level corresponds to a water level at which all of the water generating flow channel 1240, the stirrer 1270, and the evaporator 1054 installed on the inner side of the cold water tank assembly 1200 are immersed.

A rotation speed of the stirrer 1270 per unit time is varied according to water levels of the cooling water accommodation unit 1220. Since the stirrer 1270 is connected to the motor 1271 by a shaft, a rotation speed of the stirrer 1270 per unit time is equal to a rotation speed of the motor 1272 per unit time. Thus, the controller 1080 may measure a rotation speed of the stirrer 1270 per unit time from the rotation speed of the motor 1272 per unit time.

Stirrer 1270 rotates most quickly at a water level lower than a water level at which the stirrer 1270 is immersed in cooling water. The moment the stirrer 1270 is immersed in cooling water, a rotation speed of the stirrer 1270 per unit time is lowered due to resistance formed by cooling water, and as the water level of cooling water rises, the rotation speed of the stirrer 1270 per unit time is increasingly lowered. Thus, a rotation speed of the stirrer 1270 corresponding to the reference water level (i.e., the water level at which all of the cold water generating flow channel 1240, the stirrer 1270, and the evaporator 1054 are immersed) is set as a reference speed, and when the rotation speed of the stirrer 1270 is lower than the reference speed, the controller 1080 may determine whether cooling water has been filled up to the reference water level.

When cooling water formed by purified water is supplied to the cooling water accommodation unit 1220 through the drain valve 1280, the cooling water accommodation unit 1220 may be filled with cooling water even without having to open the cold water tank cover 1201 of the cold water tank assembly 1200. Also, when it is determined whether cooling water has been filled up to the reference water level on the basis of a rotation speed of the stirrer 1270 per unit time, whether water is normally supplied may be determined even without a water level sensor.

When it is determined that cooling water has been filled up to the reference water level on the basis of a rotation speed of the stirrer 1270 per unit time, it may be displayed that normal water supply of cooling water has been completed through the output unit 1016b. Also, the water dispenser 1000 completes supply of cooling water and resumes a normal operation to produce cold water and/or hot water.

If it is determined that cooling water has not been filled up to the reference water level, it may be displayed that cooling water is required to be additionally supplied through the output unit 1016b. A pulse value corresponding to a flow rate to be additionally supplied may be input again to the first flow rate sensor 1063a and/or the second flow rate sensor 1063b to perform additional water supply, and the controller 1080 determines whether cooling water has been filled up to the reference water level on the basis of a rotation speed of the stirrer 1270 per unit time. This process may be repeated until cooling water is filled up to the reference water level.

The output unit 1016b may be configured to display that raw water or purified water should be supplied to the cooling water accommodation unit 1220 on the basis of a rotation speed of the stirrer 1270 per unit time. This is because, when the rotation speed of the stirrer per unit time exceeds the reference speed, it means that a water level of cooling water has been lowered.

Figure 11:
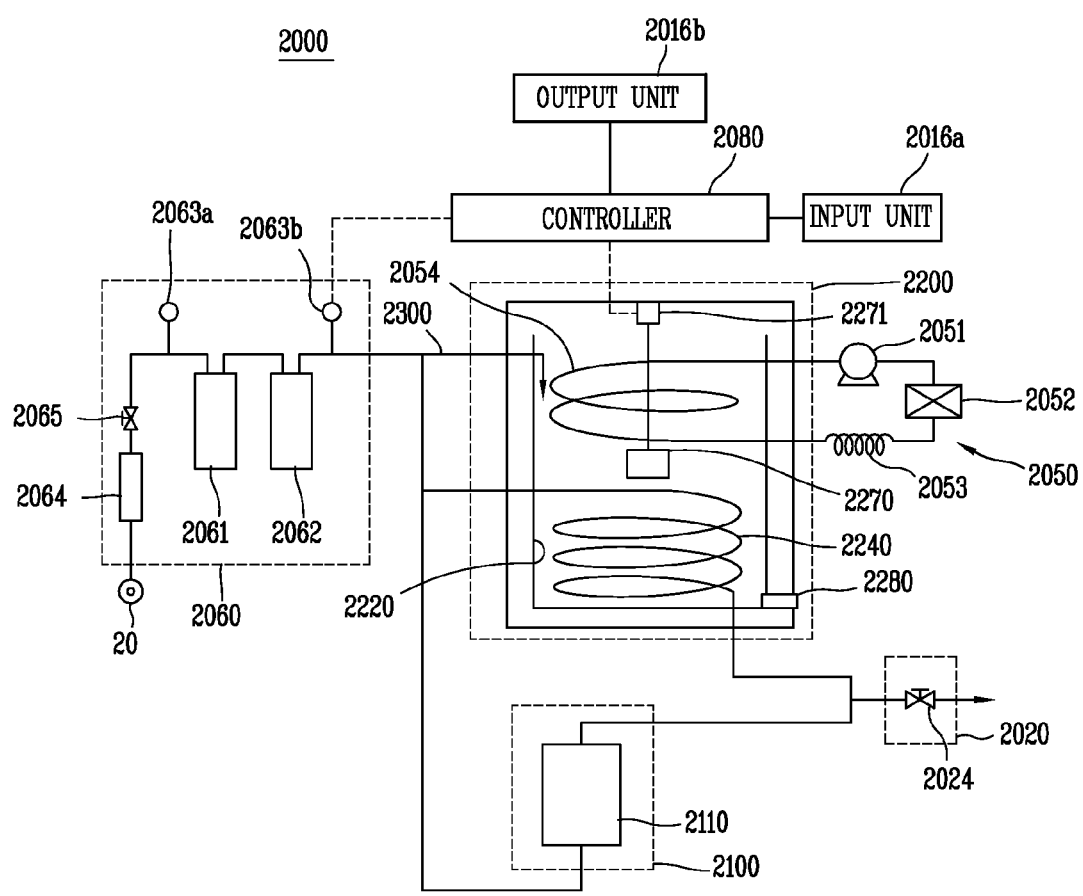
FIG. 11 is a conceptual view illustrating a water dispenser of embodiment 2-1.

FIG. 11 is a conceptual view illustrating a water dispenser 2000 of the embodiment 2-1.

An operation of supplying cold water and hot water of the water dispenser 2000 is the same as that described above with reference to FIG. 10, and thus, only supply of cooling water will be described hereinafter.

At least a portion of a cooling water flow channel is formed by a pipe 2300 installed within the water dispenser 2000. In order to supply purified water produced by the filter unit 2060 to the cooling water accommodation unit 2220, one end of the pipe 2300 is connected to the filter unit 2060 and the other end thereof is connected to the cold water tank assembly 2200. Pipe 2300 may be branched between the filter unit 2060 and the cold water generating flow channel 2240. A branch valve (not shown) may be installed in a branch position.

Referring to FIG. 11, the cooling water flow channel is formed by a flow channel connected from the raw water supply unit 20 to the filter unit 2060 and the pipe 2300. Unlike the configuration of FIG. 10, the cold water generating flow channel 2240 and the drain valve 2280 are not included in the cooling water flow channel. Thus, in the embodiment 2-1, it can be seen that cooling water is formed by purified water at room temperature.

Cooling water is preferably formed by purified water for sanitary reasons. In embodiment 1-1 and embodiment 1-2, the user should connect the hose 1300 or 1300' to the dispensing unit 1020 or 1020' and the drain valve 1280 or 1280' to supply cooling water, but in the embodiment 2-1, such an operation is not required.

In order to supply cooling water, first, cooling water already filled in the cooling water accommodation unit 2220 should be drained. The draining of cooling water may be performed by directly operating the drain valve 2280 or by applying a control command for opening the drain valve 2280 to the input unit 2016*a*.

Thereafter, when user enters a cooling water supply control command through the input unit 2016*a*, a raw water valve 2065 is opened and raw water, flowing along the cooling water flow channel, turns to purified water through the filter unit 2060 and is supplied to the cooling water accommodation unit 2220. Thus, in the embodiment 2-1, cooling water is formed as purified water having room temperature.

A flow rate of cooling water (purified water at room temperature) filled in the cooling water accommodation unit 2220 is designated as a pulse value in the first flow rate sensor 2063*a* and/or the second flow rate sensor 2063*b*. When the flow rate corresponding to the designated pulse value passes through the first flow rate sensor 2063*a* and/or the second flow rate sensor 2063*b*, supply of purified water is stopped. The controller 2080 controls the first flow rate sensor 2063*a* or the second flow rate sensor 2063*b*, and stops supply of purified water on the basis of a water supply amount measured by the first flow rate sensor 2063*a* or the second flow rate sensor 2063*b*. Accordingly, a preset flow rate of cooling water may be supplied to the cooling water accommodation unit 2220.

Draining or supplying of cooling water may be automatically performed. For example, the water dispenser 2000 may be configured to perform an operation of draining or supplying cooling water according to a water level of cooling water that can be known from (1) a preset replacement period of cooling water, (2) a contamination degree of cooling water measured by a sensor, or the like, or (3) a water level of cooling water that can be known from a rotation speed of the stirrer 2270 per unit time.

In order to allow cooling water to be automatically drained, the drain valve 2280 may be formed as an electronic drain valve 2280 which can be opened and closed by an electric signal, or the like, rather than a mechanical drain value. For example, a solenoid valve may be opened and closed by an electrical signal. Also, in order to allow cooling water to be automatically drained, preferably, a separate flow channel is provided on a downstream side of the drain valve 2280 such that cooling water drained from the drain valve 2280 to be discarded to a drain, or the like.

When the drain valve 2280 is opened by an electric signal and draining of cooling water is completed, cooling water is supplied as described above. After supply of cooling water is completed, it is determined whether cooling water has been normally supplied up to the reference water level from a rotation speed of the stirrer 2270 per unit time.

In FIG. 11, reference numeral 2016*b* denotes an output unit, 2061 and 2062 denote unit filters, 2064 denotes a pre-filter, 2065 denotes a raw water valve, 2100 denotes a heating device, 2110 denotes an induction heating module, 2020 denotes a dispensing unit, 2024 denotes a valve, 2270 denotes a stirrer, 2271 denotes a motor, 2050 denotes a refrigerating cycle device, 2051 denotes a compressor, 2052 denotes a condenser, 2053 denotes an expansion device, 2054 denotes an evaporator, and 2280 denotes a drain valve.

Figure 12:
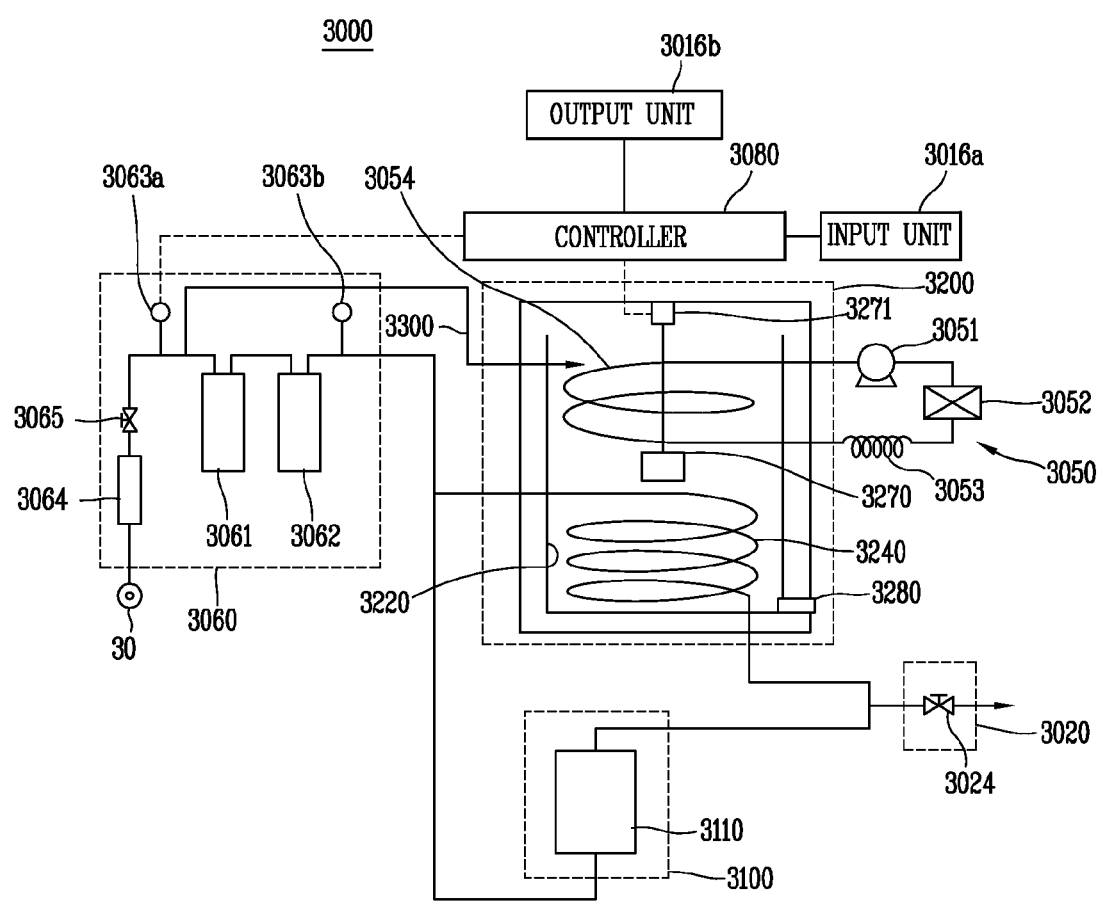
FIG. 12 is a conceptual view illustrating a water dispenser of embodiment 2-2.

FIG. 12 is a conceptual view illustrating a water dispenser 3000 of embodiment 2-2.

Operations of supplying cold water and hot water of the water dispenser 3000 is the same as those described above with reference to FIG. 10, and thus, only supply of cooling water will be described hereinafter.

The configuration of the embodiment 2-2 illustrated in FIG. 12 is similar to that of the embodiment 2-1, except for a cooling water flow channel.

At least a portion of the cooling water flow channel is formed by a pipe 3300 installed within the water dispenser 3000. In order to supply raw water supplied from a raw water supply unit 30, one end of the pipe 3300 is connected to the raw water supply unit 30 and the other end thereof is connected to a col water tank assembly 3200. Here, however, one end of the pipe 330 is not directly connected to the raw water supply unit 30 but branched on a downstream side of the first flow rate sensor 3063*a* and is indirectly connected to the raw water supply unit 30. A branch valve (not shown) may be installed in a branched position.

Referring to FIG. 12, the cooling water flow channel is formed by a flow channel connected from the raw water supply unit 30 to the pipe 3300. Unlike the configuration of FIG. 11, the unit filters 3061 and 3062 are not included in the cooling water flow channel. Thus, in the embodiment 2-2, it can be seen that cooling water is formed as raw water having room temperature.

The embodiment 2-2 is differentiated from the embodiment 2-1 in that cooling water is formed as raw water. Cooling water is preferably formed as purified water for sanitary reasons, but since it is not mixed with purified water or cold water, cooling water is not necessarily formed as purified water. FIG. 12 illustrates a configuration in which raw water is formed as cooling water.

In order to supply cooling water, first, cooling water already filled in the cooling water accommodation unit 3220 should be drained. Draining of cooling water may be performed by operating the drain valve 3280 directly by the user or by applying a control command for opening the drain valve 3280 to the input unit 3016*a*.

When the user inputs a cooling water supply control command through the input unit 3016*a*, the raw water valve 3065 is opened and raw water, while flowing along the cooling water flow channel, is supplied to the cooling water accommodation unit 3220. Thus, in the embodiment 2-2, cooling water is formed as raw water having room temperature.

A flow rate of cooling water (raw water having room temperature) filled in the cooling water accommodation unit 3220 is designated by a pulse value in the first flow rate sensor 3063*a*. When the flow rate corresponding to the designated pulse value passes through the first flow rate sensor 3063*a*, supply of raw water is stopped. The controller 3080 controls the first flow rate sensor 3063*a*, and stops the supply of raw water on the basis of a water supply amount measured by the first flow rate sensor 3063*a*. Thus, a preset flow rate of cooling water may be supplied to the cooling water accommodation unit 3220.

Similar to those described above with reference to FIG. 11, draining and supply of cooling water may be automatically performed.

In FIG. 12, reference numeral 3016*b* denotes an output unit, 3061 and 3062 denote unit filters, 3064 denotes a pre-filter, 3065 denotes a raw water valve, 3100 denotes a heating device, 3110 denotes an induction heating module, 3020 denotes a dispensing unit, 3024 denotes a valve, 3270 denotes a stirrer, 3271 denotes a motor, 3050 denotes a refrigerating cycle device, 3051 denotes a compressor, 3052 denotes a condenser, 3053 denotes an expansion device, 3054 denotes an evaporator, and 3280 denotes a drain valve.

The water dispenser(s) described above are not limited to the configuration and method of the embodiments of the present disclosure described above and the entirety or a portion of the embodiments may be selectively combined to form various modifications.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A water dispenser comprising:
    a filter unit filtering raw water supplied from a raw water supply unit to produce purified water;
    a cold water tank assembly comprising:
        a cooling water accommodation unit to hold cooling water, and
        a cold water generating flow channel immersed in the cooling water,
        wherein the produced purified water is passed through the cold water generating flow channel immersed in the cooling water in the cooling water accommodation unit to produce cold water;
    a refrigerating cycle device having a compressor, a condenser, an expansion device, and an evaporator installed on an inner side of the cold water tank assembly, to maintain the cooling water filled in the cooling water accommodation unit at a low temperature;
    a cooling water flow channel connected to the cold water tank assembly and supplying the water to the cooling water accommodation unit;
    a flow rate sensor installed in the cooling water flow channel to measure a flow rate of water supplied to the cooling water accommodation unit through the cooling water flow channel;
    a stirrer protruding from an inner upper wall of the cold water tank assembly to stir the cooling water filled in the cooling water accommodation unit; and
    a controller to stop the supply of water to the cooling water accommodation unit on the basis of a water supply amount measured by the flow rate sensor, and to determine whether the cooling water has been filled up to a reference water level on the basis of a rotation speed of the stirrer per unit time.

2. The water dispenser of claim 1, wherein the water is raw water or purified water.

3. The water dispenser of claim 1, further comprising:
    a drain valve installed in the cold water tank assembly to form an entry/exit flow channel for cooling water and exposed to the outside of a main body of the water dispenser; and
    a dispensing unit exposed to the outside of the main body of the water dispenser to discharge purified water or cold water supplied from the cold water tank assembly.

4. The water dispenser of claim 3, wherein at least a portion of the cooling water flow channel is formed by a hose exposed to the outside of the main body of the water dispenser, and
    one end the hose is connected to the dispensing unit and the other end thereof is connected to the drain valve to supply purified water dispensed through the dispensing unit to the cooling water accommodation unit.

5. The water dispenser of claim 4, wherein the hose is detachably coupled to the dispensing unit and the drain valve.

6. The water dispenser of claim 5, further comprising:
    an input unit for receiving a control command,
    wherein when a control command is applied through the input unit after the hose is coupled to the dispensing unit and the drain valve, supply of purified water to the cooling water accommodation unit through the dispensing unit and the hose starts.

7. The water dispenser of claim 3, wherein the drain valve is opened and closed by a pressing force applied from the outside of the water dispenser.

8. The water dispenser of claim 3, wherein
    the drain valve includes:
    a housing having a hollow part and having a first arrest protrusion formed in the hollow part and a second arrest protrusion formed on an upstream side of the first arrest protrusion;
    a press operating part disposed in the hollow part of the housing and having a first part caught by the first arrest protrusion and a second part exposed to the outside and receiving a pressing force for opening and closing the drain valve; and
    an elastic member installed in a position supported by the second arrest protrusion and providing elastic force to allow the first part of the press operating part to be tightly attached to the first arrest protrusion.

9. The water dispenser of claim 8, wherein
    the hose includes:
    a pressing part formed in the hollow part of the hose and pressing the press operating part when the hose is coupled to the drain valve; and
    connection parts radially disposed around the pressing part to connect the pressing part to an inner circumferential surface of the hose.

10. The water dispenser of claim 1, wherein
    at least a portion of the cooling water flow channel is formed by a pipe installed within the water dispenser, and
    one end of the pipe is connected to the raw water supply unit or the filter unit and the other end thereof is connected to the cold water tank assembly to supply raw water supplied from the raw water supply unit or purified water produced by the filter unit to the cooling water accommodation unit.

11. The water dispenser of claim 10, wherein the water dispenser starts to supply water to the cooling water accommodation unit on the basis of a rotation speed of the stirrer per unit time.

12. The water dispenser of claim 1, further comprising:
an output unit displaying state information of the water dispenser,
wherein the output unit indicates that water should start to be supplied to the cooling water accommodation unit on the basis of a rotation speed of the stirrer per unit time.

* * * * *